(12) United States Patent
Doran et al.

(10) Patent No.: US 8,229,851 B2
(45) Date of Patent: Jul. 24, 2012

(54) METHODS AND SYSTEMS FOR EXCHANGING/TRANSFERRING GIFT CARDS

(75) Inventors: Michael Doran, Bothell, WA (US); Douglas A. Martin, Woodinville, WA (US); Scott A. Dean, Issaquah, WA (US); Jessaca Jacobson, Newcastle, WA (US); Kim P. Hanson, Woodinville, WA (US); Kerry Smith, Bellevue, WA (US)

(73) Assignee: Coinstar, Inc., Bellevue, WA (US)

( * ) Notice: Subject to any disclaimer, the term of this patent is extended or adjusted under 35 U.S.C. 154(b) by 0 days.

(21) Appl. No.: 13/213,421

(22) Filed: Aug. 19, 2011

(65) Prior Publication Data

US 2011/0307378 A1    Dec. 15, 2011

Related U.S. Application Data

(60) Division of application No. 12/758,677, filed on Apr. 12, 2010, now Pat. No. 8,024,272, which is a continuation of application No. 12/647,594, filed on Dec. 28, 2009, now Pat. No. 8,103,586, which is a continuation of application No. 10/504,436, filed as application No. PCT/US03/04603 on Feb. 14, 2003, now Pat. No. 7,653,599.

(60) Provisional application No. 60/357,555, filed on Feb. 15, 2002, provisional application No. 60/357,331, filed on Feb. 15, 2002, provisional application No. 60/419,735, filed on Oct. 18, 2002, provisional application No. 60/424,377, filed on Nov. 6, 2002.

(51) Int. Cl.
*G06Q 40/00* (2012.01)

(52) U.S. Cl. ........................................ 705/41

(58) Field of Classification Search .................. 705/14, 705/35, 39–41, 44, 64–68, 75; 235/375, 235/380–382.5; 902/8, 22, 24–26, 30–32; 725/6

See application file for complete search history.

(56) References Cited

U.S. PATENT DOCUMENTS

| 446,303 A | 2/1891 | Thompson |
| 576,141 A | 2/1897 | Muenchinger |
| 1,010,993 A | 12/1911 | White |

(Continued)

FOREIGN PATENT DOCUMENTS

CA   1053598   5/1979

(Continued)

OTHER PUBLICATIONS

Scan Coin User's Manual, CDS 640, 1988, 7 pages.*

(Continued)

*Primary Examiner* — Mary Cheung
(74) *Attorney, Agent, or Firm* — Perkins Coie LLP

(57) ABSTRACT

Methods and systems for exchanging various forms of value, including coins, currency, credit, debit, and/or bank account funds, for prepaid cash cards, credit cards, phone cards, and the like. In one embodiment, a value exchange machine includes a coin input region, a coin sorting/counting apparatus, a card reader, and a communications facility configured to communicate with a remote computer network. In another embodiment, a value exchange system includes one or more of the value exchange machines connected to one or more remote computers via a communications link. A user wishing to purchase, for example, a prepaid cash card can visit one of the value exchange machines, select the desired transaction, and pay for the card with coins, currency, a credit card, a debit card, and/or bank account funds. After confirming payment, the value exchange machine dispenses the card to the user.

17 Claims, 9 Drawing Sheets

U.S. PATENT DOCUMENTS

| | | |
|---|---|---|
| 1,234,707 A | 7/1917 | Whistler |
| 1,711,049 A | 4/1929 | Fonda et al. |
| 1,813,296 A | 7/1931 | Kidwell |
| 1,847,940 A | 3/1932 | Giles |
| 1,945,948 A | 2/1934 | Morin |
| 2,014,505 A | 9/1935 | Patche |
| 2,317,351 A | 4/1943 | Andalikiewicz et al. |
| 2,461,314 A | 2/1949 | Davis et al. |
| 2,569,360 A | 9/1951 | Weingart |
| 2,644,470 A | 7/1953 | Labbe |
| 2,865,561 A | 12/1958 | Rosapepe |
| 2,881,774 A | 4/1959 | Labbe |
| 2,960,377 A | 1/1960 | Simjian |
| 3,009,555 A | 11/1961 | Seckula, Sr. |
| 3,048,251 A | 8/1962 | Bower |
| 3,056,132 A | 9/1962 | Simjian |
| 3,065,467 A | 11/1962 | Prevost |
| 3,132,654 A | 5/1964 | Adams |
| 3,173,742 A | 3/1965 | Simjian |
| 3,196,257 A | 7/1965 | Buchholtz et al. |
| 3,396,737 A | 8/1968 | Picollo |
| 3,415,348 A | 12/1968 | Wahlberg |
| 3,599,771 A | 8/1971 | Hinterstocker |
| 3,603,327 A | 9/1971 | Buchholz et al. |
| 3,763,871 A | 10/1973 | Jobst |
| 3,788,440 A | 1/1974 | Propice et al. |
| 3,815,717 A | 6/1974 | Arseneau |
| 3,941,226 A | 3/1976 | Drakes |
| 3,960,293 A | 6/1976 | Sweet, II et al. |
| 3,969,584 A | 7/1976 | Miller et al. |
| 3,998,237 A | 12/1976 | Kressin et al. |
| 4,014,424 A | 3/1977 | Hall |
| 4,036,242 A | 7/1977 | Breitenstein et al. |
| 4,058,954 A | 11/1977 | Asami |
| 4,059,122 A | 11/1977 | Kinoshita |
| 4,092,990 A | 6/1978 | Bayne |
| 4,099,722 A | 7/1978 | Rodesch et al. |
| 4,100,925 A | 7/1978 | Fukunaga |
| 4,106,610 A | 8/1978 | Heiman |
| 4,124,109 A | 11/1978 | Bissell et al. |
| 4,141,372 A | 2/1979 | Gdanski |
| 4,167,949 A | 9/1979 | Hashimoto et al. |
| 4,172,462 A | 10/1979 | Uchida et al. |
| 4,225,056 A | 9/1980 | Flubacker |
| 4,228,811 A | 10/1980 | Tanaka et al. |
| 4,230,213 A | 10/1980 | Spring |
| 4,249,552 A | 2/1981 | Margolin et al. |
| 4,266,121 A | 5/1981 | Hirose |
| 4,275,751 A | 6/1981 | Bergman |
| 4,306,644 A | 12/1981 | Rockola et al. |
| 4,321,672 A | 3/1982 | Braun et al. |
| 4,326,620 A | 4/1982 | Felix et al. |
| 4,346,798 A | 8/1982 | Agey, III |
| 4,356,829 A | 11/1982 | Furuya et al. |
| 4,360,034 A | 11/1982 | Davila et al. |
| 4,369,442 A | 1/1983 | Werth et al. |
| 4,369,800 A | 1/1983 | Watanabe et al. |
| 4,374,557 A | 2/1983 | Sugimoto et al. |
| 4,376,442 A | 3/1983 | Gomez et al. |
| 4,380,316 A | 4/1983 | Glinka et al. |
| 4,383,540 A | 5/1983 | De Meyer et al. |
| 4,398,550 A | 8/1983 | Shireman |
| 4,412,292 A | 10/1983 | Sedam et al. |
| 4,412,607 A | 11/1983 | Collins et al. |
| 4,434,359 A | 2/1984 | Watanabe et al. |
| 4,436,103 A | 3/1984 | Dick |
| 4,442,850 A | 4/1984 | Austin et al. |
| 4,447,714 A | 5/1984 | Lundblad |
| 4,503,963 A | 3/1985 | Steiner |
| 4,504,357 A | 3/1985 | Holbein et al. |
| 4,506,685 A | 3/1985 | Childers et al. |
| 4,509,122 A | 4/1985 | Agnew et al. |
| 4,509,633 A | 4/1985 | Chow |
| 4,542,817 A | 9/1985 | Paulson |
| 4,543,969 A | 10/1985 | Rasmussen |
| 4,554,446 A | 11/1985 | Murphy et al. |
| 4,555,618 A | 11/1985 | Riskin |
| 4,558,711 A | 12/1985 | Ikuta Yoshiaki et al. |
| 4,577,744 A | 3/1986 | Doucet et al. |
| 4,587,984 A | 5/1986 | Levasseur et al. |
| 4,597,487 A | 7/1986 | Crosby et al. |
| 4,598,378 A | 7/1986 | Giacomo |
| 4,611,205 A | 9/1986 | Eglise et al. |
| 4,616,323 A | 10/1986 | Hayashi |
| 4,616,776 A | 10/1986 | Blumenthal et al. |
| 4,620,559 A | 11/1986 | Childers et al. |
| 4,622,456 A | 11/1986 | Naruto et al. |
| 4,641,239 A | 2/1987 | Takesako |
| 4,672,377 A | 6/1987 | Murphy et al. |
| 4,677,565 A | 6/1987 | Ogaki et al. |
| 4,694,845 A | 9/1987 | Zay |
| 4,706,577 A | 11/1987 | Jones et al. |
| 4,706,795 A | 11/1987 | Mikami et al. |
| 4,716,799 A | 1/1988 | Hartmann |
| 4,723,212 A | 2/1988 | Mindrum et al. |
| 4,733,765 A | 3/1988 | Watanabe et al. |
| 4,753,625 A | 6/1988 | Okada et al. |
| 4,767,917 A | 8/1988 | Ushikubo |
| 4,775,353 A | 10/1988 | Childers et al. |
| 4,775,354 A | 10/1988 | Rasmussen et al. |
| 4,809,837 A | 3/1989 | Hayashi et al. |
| 4,814,589 A | 3/1989 | Storch et al. |
| 4,817,043 A | 3/1989 | Brown |
| 4,831,374 A | 5/1989 | Masel |
| 4,833,308 A | 5/1989 | Humble |
| 4,882,675 A | 11/1989 | Nichtberger et al. |
| 4,883,158 A | 11/1989 | Kobayashi et al. |
| 4,884,672 A | 12/1989 | Parker |
| 4,896,791 A | 1/1990 | Smith |
| 4,898,564 A | 2/1990 | Gunn et al. |
| 4,910,672 A | 3/1990 | Off et al. |
| 4,915,205 A | 4/1990 | Reid et al. |
| 4,921,463 A | 5/1990 | Primdahl et al. |
| 4,936,436 A | 6/1990 | Keltner |
| 4,953,086 A | 8/1990 | Fukatsu |
| 4,959,624 A | 9/1990 | Higgins, Jr. et al. |
| 4,963,118 A | 10/1990 | Gunn et al. |
| 4,964,495 A | 10/1990 | Rasmussen |
| 4,969,549 A | 11/1990 | Eglise et al. |
| 4,978,322 A | 12/1990 | Paulsen |
| 4,995,848 A | 2/1991 | Goh et al. |
| 4,997,406 A | 3/1991 | Horiguchi et al. |
| 5,010,238 A | 4/1991 | Kadono et al. |
| 5,021,967 A | 6/1991 | Smith |
| 5,022,889 A | 6/1991 | Ristvedt et al. |
| 5,025,139 A | 6/1991 | Halliburton, Jr. |
| 5,027,937 A | 7/1991 | Parish et al. |
| 5,039,848 A | 8/1991 | Stoken |
| 5,040,657 A | 8/1991 | Gunn et al. |
| 5,055,657 A | 10/1991 | Miller et al. |
| 5,056,644 A | 10/1991 | Parker |
| 5,073,767 A | 12/1991 | Holmes et al. |
| 5,083,765 A | 1/1992 | Kringel |
| 5,083,814 A | 1/1992 | Guinta et al. |
| 5,088,587 A | 2/1992 | Goodrich et al. |
| 5,091,713 A | 2/1992 | Horne et al. |
| 5,098,339 A | 3/1992 | Dabrowski |
| 5,098,340 A | 3/1992 | Abe |
| 5,100,367 A | 3/1992 | Abe et al. |
| 5,111,927 A | 5/1992 | Schulze, Jr. |
| 5,114,381 A | 5/1992 | Ueda et al. |
| 5,135,433 A | 8/1992 | Watanabe et al. |
| 5,163,868 A | 11/1992 | Adams et al. |
| 5,173,851 A | 12/1992 | Off et al. |
| 5,174,608 A | 12/1992 | Benardelli |
| 5,183,142 A | 2/1993 | Latchinian et al. |
| 5,195,626 A | 3/1993 | Le Hong et al. |
| 5,201,396 A | 4/1993 | Chalabian et al. |
| 5,219,059 A | 6/1993 | Furuya et al. |
| 5,226,519 A | 7/1993 | DeWoolfson |
| 5,227,874 A | 7/1993 | Von Kohorn |
| 5,236,339 A | 8/1993 | Nishiumi et al. |
| 5,251,738 A | 10/1993 | Dabrowski |
| 5,252,811 A | 10/1993 | Henochowicz et al. |
| 5,265,033 A | 11/1993 | Vajk et al. |
| 5,293,981 A | 3/1994 | Abe et al. |
| 5,299,673 A | 4/1994 | Wu |

| Patent | Kind | Date | Inventor |
|---|---|---|---|
| 5,302,811 | A | 4/1994 | Fukatsu et al. |
| 5,305,195 | A | 4/1994 | Murphy |
| 5,316,120 | A | 5/1994 | Ibarrola et al. |
| 5,316,517 | A | 5/1994 | Chiba et al. |
| 5,321,242 | A | 6/1994 | Heath, Jr. |
| 5,330,041 | A | 7/1994 | Dobbins et al. |
| 5,350,906 | A | 9/1994 | Brody et al. |
| 5,355,988 | A | 10/1994 | Shirasawa |
| 5,365,046 | A | 11/1994 | Haymann |
| 5,374,814 | A | 12/1994 | Kako et al. |
| 5,388,680 | A | 2/1995 | Hird et al. |
| RE34,915 | E | 4/1995 | Nichtberger et al. |
| 5,409,092 | A | 4/1995 | Itako et al. |
| 5,429,222 | A | 7/1995 | Delay et al. |
| 5,435,777 | A | 7/1995 | Takatani et al. |
| 5,440,108 | A | 8/1995 | Tran et al. |
| 5,441,139 | A | 8/1995 | Abe et al. |
| 5,449,058 | A | 9/1995 | Kotler et al. |
| 5,457,305 | A | 10/1995 | Akel et al. |
| 5,469,951 | A | 11/1995 | Takemoto et al. |
| 5,479,507 | A | 12/1995 | Anderson |
| 5,483,363 | A | 1/1996 | Holmes et al. |
| 5,506,393 | A | 4/1996 | Ziarno |
| 5,511,114 | A | 4/1996 | Stimson et al. |
| 5,513,738 | A | 5/1996 | Hird et al. |
| 5,531,640 | A | 7/1996 | Inoue |
| 5,554,070 | A | 9/1996 | Takatoshi et al. |
| 5,555,497 | A | 9/1996 | Helbling |
| 5,560,467 | A | 10/1996 | Takemoto |
| 5,564,546 | A | 10/1996 | Molbak et al. |
| 5,564,974 | A | 10/1996 | Mazur et al. |
| 5,577,959 | A | 11/1996 | Takemoto et al. |
| 5,620,079 | A * | 4/1997 | Molbak .................. 194/217 |
| 5,637,845 | A | 6/1997 | Kolls |
| 5,652,421 | A | 7/1997 | Veeneman et al. |
| 5,661,285 | A | 8/1997 | Elrick et al. |
| 5,663,546 | A | 9/1997 | Cucinotta et al. |
| 5,665,952 | A | 9/1997 | Ziarno |
| D385,488 | S | 10/1997 | Smith et al. |
| 5,679,070 | A | 10/1997 | Ishida et al. |
| 5,696,908 | A | 12/1997 | Muehlberger et al. |
| 5,699,328 | A | 12/1997 | Ishizaki et al. |
| 5,721,768 | A | 2/1998 | Stimson et al. |
| 5,732,398 | A | 3/1998 | Tagawa |
| 5,734,722 | A | 3/1998 | Halpern et al. |
| 5,743,429 | A | 4/1998 | Morofsky |
| 5,746,299 | A | 5/1998 | Molbak et al. |
| 5,748,908 | A | 5/1998 | Yu |
| 5,777,305 | A | 7/1998 | Smith et al. |
| 5,799,767 | A | 9/1998 | Molbak |
| 5,835,061 | A | 11/1998 | Stewart |
| 5,839,956 | A | 11/1998 | Takemoto |
| 5,842,916 | A | 12/1998 | Gerrity et al. |
| 5,868,236 | A | 2/1999 | Rademacher |
| 5,880,444 | A | 3/1999 | Shibata et al. |
| 5,905,810 | A | 5/1999 | Jones et al. |
| 5,909,792 | A | 6/1999 | Gerlier et al. |
| 5,909,793 | A | 6/1999 | Beach et al. |
| 5,909,794 | A | 6/1999 | Molbak et al. |
| 5,943,423 | A | 8/1999 | Muftic |
| 5,953,504 | A | 9/1999 | Sokal et al. |
| 5,956,697 | A | 9/1999 | Usui |
| 5,964,830 | A | 10/1999 | Durrett |
| 5,974,146 | A | 10/1999 | Randle et al. |
| 5,982,918 | A | 11/1999 | Mennie et al. |
| 5,988,348 | A | 11/1999 | Martin et al. |
| 5,991,413 | A | 11/1999 | Arditti et al. |
| 6,014,636 | A | 1/2000 | Reeder |
| 6,021,883 | A | 2/2000 | Casanova et al. |
| 6,028,920 | A | 2/2000 | Carson |
| 6,047,807 | A | 4/2000 | Molbak |
| 6,047,808 | A | 4/2000 | Neubarth et al. |
| 6,081,791 | A | 6/2000 | Clark |
| 6,105,007 | A | 8/2000 | Norris |
| 6,105,008 | A | 8/2000 | Davis et al. |
| 6,105,009 | A | 8/2000 | Cuervo |
| 6,110,044 | A | 8/2000 | Stern |
| 6,116,402 | A | 9/2000 | Beach et al. |
| 6,119,099 | A | 9/2000 | Walker et al. |
| 6,119,945 | A | 9/2000 | Muller et al. |
| 6,128,402 | A | 10/2000 | Jones et al. |
| 6,129,275 | A * | 10/2000 | Urquhart et al. .............. 235/381 |
| 6,138,106 | A | 10/2000 | Walker et al. |
| 6,144,946 | A | 11/2000 | Iwamura et al. |
| 6,152,365 | A | 11/2000 | Kolls |
| 6,185,545 | B1 | 2/2001 | Resnick et al. |
| 6,193,155 | B1 | 2/2001 | Walker et al. |
| 6,196,371 | B1 | 3/2001 | Martin et al. |
| 6,227,343 | B1 | 5/2001 | Neathway et al. |
| 6,230,928 | B1 | 5/2001 | Hanna et al. |
| 6,233,564 | B1 | 5/2001 | Schulze, Jr. |
| 6,243,450 | B1 | 6/2001 | Jansen et al. |
| 6,264,545 | B1 | 7/2001 | Magee et al. |
| 6,267,292 | B1 | 7/2001 | Walker et al. |
| 6,269,349 | B1 | 7/2001 | Aieta et al. |
| 6,289,324 | B1 | 9/2001 | Kawan |
| 6,292,211 | B1 | 9/2001 | Pena |
| 6,308,887 | B1 | 10/2001 | Korman et al. |
| 6,318,536 | B1 * | 11/2001 | Korman et al. ............... 194/217 |
| 6,318,537 | B1 | 11/2001 | Jones et al. |
| 6,349,972 | B1 | 2/2002 | Geiger et al. |
| 6,363,164 | B1 | 3/2002 | Jones et al. |
| 6,375,080 | B1 | 4/2002 | Cremonese |
| 6,401,010 | B1 | 6/2002 | Takahashi |
| 6,405,182 | B1 | 6/2002 | Cuervo |
| 6,415,262 | B1 | 7/2002 | Walker et al. |
| 6,484,863 | B1 | 11/2002 | Molbak |
| 6,494,776 | B1 | 12/2002 | Molbak |
| 6,502,745 | B1 * | 1/2003 | Stimson et al. ............... 235/375 |
| 6,505,774 | B1 | 1/2003 | Fulcher et al. |
| 6,536,037 | B1 | 3/2003 | Guheen et al. |
| 6,554,184 | B1 | 4/2003 | Amos |
| 6,575,361 | B1 | 6/2003 | Graves et al. |
| 6,575,362 | B1 | 6/2003 | Bator et al. |
| 6,637,576 | B1 | 10/2003 | Jones et al. |
| 6,659,259 | B2 | 12/2003 | Knox et al. |
| 6,694,300 | B1 | 2/2004 | Walker et al. |
| 6,704,039 | B2 | 3/2004 | Pena |
| 6,705,448 | B1 | 3/2004 | Steel et al. |
| 6,736,251 | B2 | 5/2004 | Molbak |
| 6,745,022 | B2 | 6/2004 | Knox |
| 6,748,067 | B2 | 6/2004 | Malik |
| 6,748,101 | B1 | 6/2004 | Jones et al. |
| 6,758,316 | B2 | 7/2004 | Molbak |
| 6,772,146 | B2 | 8/2004 | Khemlani et al. |
| 6,778,693 | B2 | 8/2004 | Jones et al. |
| 6,823,172 | B1 | 11/2004 | Forrest |
| 6,829,596 | B1 | 12/2004 | Frazee |
| 6,854,581 | B2 | 2/2005 | Molbak |
| 6,896,118 | B2 | 5/2005 | Jones et al. |
| 6,918,537 | B2 | 7/2005 | Graves et al. |
| 6,945,457 | B1 | 9/2005 | Barcelou |
| 6,960,986 | B2 | 11/2005 | Asama et al. |
| 6,965,667 | B2 | 11/2005 | Trabandt et al. |
| 6,973,443 | B2 | 12/2005 | Drummond et al. |
| 6,976,570 | B2 | 12/2005 | Molbak |
| 6,983,836 | B2 | 1/2006 | Adams et al. |
| 7,014,108 | B2 | 3/2006 | Sorenson et al. |
| 7,028,827 | B1 | 4/2006 | Molbak et al. |
| 7,028,891 | B2 | 4/2006 | O'Neal |
| 7,039,603 | B2 | 5/2006 | Walker et al. |
| 7,058,581 | B1 | 6/2006 | Young |
| D524,857 | S | 7/2006 | Graves et al. |
| D524,858 | S | 7/2006 | Graves et al. |
| D524,859 | S | 7/2006 | Graves et al. |
| 7,083,084 | B2 | 8/2006 | Graves et al. |
| 7,093,761 | B2 | 8/2006 | Smith et al. |
| 7,113,929 | B1 | 9/2006 | Beach et al. |
| 7,128,261 | B1 | 10/2006 | Henderson et al. |
| 7,131,580 | B2 | 11/2006 | Molbak |
| D533,220 | S | 12/2006 | Graves et al. |
| 7,149,336 | B2 | 12/2006 | Jones et al. |
| 7,156,300 | B1 | 1/2007 | Dentlinger |
| 7,158,662 | B2 | 1/2007 | Chiles |
| 7,168,615 | B2 | 1/2007 | Smith |
| 7,219,835 | B2 | 5/2007 | Graves et al. |
| 7,249,054 | B2 | 7/2007 | Keil |
| 7,252,226 | B2 | 8/2007 | Risafi et al. |

| | | |
|---|---|---|
| 7,255,268 B2 | 8/2007 | Dentlinger |
| 7,303,119 B2 | 12/2007 | Molbak |
| 7,331,521 B2 | 2/2008 | Sorenson et al. |
| RE40,186 E | 3/2008 | Walker et al. |
| 7,343,349 B2 | 3/2008 | Ranzini et al. |
| 7,349,566 B2 | 3/2008 | Jones et al. |
| 7,356,507 B2 | 4/2008 | Bezos et al. |
| 7,494,048 B2 | 2/2009 | Gusler et al. |
| 7,551,764 B2 | 6/2009 | Chiles et al. |
| 7,561,299 B2 | 7/2009 | Elarde et al. |
| 7,597,255 B2 | 10/2009 | Deane et al. |
| 7,653,599 B2 | 1/2010 | Doran et al. |
| 7,778,456 B2 | 8/2010 | Jones et al. |
| 7,780,075 B2 | 8/2010 | Cooper et al. |
| 7,904,565 B2 | 3/2011 | Holden et al. |
| 8,103,586 B2 | 1/2012 | Doran et al. |
| 2001/0011680 A1 | 8/2001 | Soltesz et al. |
| 2001/0023409 A1 | 9/2001 | Keil |
| 2001/0029484 A1 | 10/2001 | Schultz et al. |
| 2001/0029488 A1 | 10/2001 | Takeshima et al. |
| 2001/0051902 A1 | 12/2001 | Messner |
| 2001/0054019 A1 | 12/2001 | de Fabrega |
| 2002/0026423 A1 | 2/2002 | Maritzen et al. |
| 2002/0046255 A1 | 4/2002 | Moore et al. |
| 2002/0065724 A1 | 5/2002 | Tsuruda |
| 2002/0069654 A1 | 6/2002 | Doi et al. |
| 2002/0082962 A1 | 6/2002 | Farris et al. |
| 2002/0087462 A1 | 7/2002 | Seifert et al. |
| 2002/0091603 A1 | 7/2002 | Steiger et al. |
| 2002/0100660 A1 | 8/2002 | Stieber et al. |
| 2002/0107738 A1 | 8/2002 | Beach et al. |
| 2002/0112162 A1 | 8/2002 | Cocotis et al. |
| 2002/0156676 A1 | 10/2002 | Ahrens et al. |
| 2002/0162895 A1 | 11/2002 | Neto |
| 2002/0174235 A1 | 11/2002 | Likourezos |
| 2002/0179401 A1 | 12/2002 | Knox et al. |
| 2002/0188511 A1 | 12/2002 | Johnson et al. |
| 2002/0194122 A1 | 12/2002 | Knox et al. |
| 2003/0046231 A1 | 3/2003 | Wu |
| 2003/0046249 A1 | 3/2003 | Wu |
| 2003/0081824 A1 | 5/2003 | Mennie et al. |
| 2003/0093367 A1 | 5/2003 | Allen-Rouman et al. |
| 2003/0172031 A1 | 9/2003 | Graves et al. |
| 2003/0204443 A1 | 10/2003 | Knox |
| 2003/0233318 A1 | 12/2003 | King et al. |
| 2004/0024700 A1 | 2/2004 | Petigny |
| 2004/0133511 A1 | 7/2004 | Smith et al. |
| 2004/0153402 A1 | 8/2004 | Smith et al. |
| 2004/0153406 A1 | 8/2004 | Alarcon-Luther et al. |
| 2004/0181481 A1 | 9/2004 | Carter |
| 2005/0017502 A1 | 1/2005 | Chariker |
| 2005/0038714 A1 | 2/2005 | Bonet et al. |
| 2005/0038737 A1 | 2/2005 | Norris |
| 2005/0045714 A1 | 3/2005 | Hermanussen |
| 2005/0051619 A1 | 3/2005 | Graves et al. |
| 2005/0080737 A1 | 4/2005 | Stein et al. |
| 2005/0107068 A1 | 5/2005 | Smith et al. |
| 2005/0108155 A1 | 5/2005 | Gallagher et al. |
| 2005/0144074 A1 | 6/2005 | Fredregill et al. |
| 2005/0171902 A1 | 8/2005 | Nguyen |
| 2005/0211768 A1 | 9/2005 | Stillman |
| 2005/0227769 A1 | 10/2005 | Morrow et al. |
| 2005/0242193 A1 | 11/2005 | Smith et al. |
| 2005/0278216 A1 | 12/2005 | Graves |
| 2006/0015402 A1 | 1/2006 | Graves et al. |
| 2006/0021396 A1 | 2/2006 | Javaux et al. |
| 2006/0037835 A1 | 2/2006 | Doran et al. |
| 2006/0106679 A1 | 5/2006 | Rosenhaft et al. |
| 2006/0143120 A1 | 6/2006 | Blackson et al. |
| 2006/0161490 A1 | 7/2006 | Chakiris et al. |
| 2006/0163341 A1 | 7/2006 | Tulluri et al. |
| 2006/0183422 A1 | 8/2006 | Defosse et al. |
| 2006/0207856 A1 | 9/2006 | Dean et al. |
| 2006/0217996 A1 | 9/2006 | Graves |
| 2006/0219519 A1 | 10/2006 | Molbak et al. |
| 2006/0231611 A1 | 10/2006 | Chakiris et al. |
| 2006/0255135 A1 | 11/2006 | Smith |
| 2006/0259189 A1 | 11/2006 | Perlow et al. |
| 2006/0293965 A1 | 12/2006 | Burton |
| 2007/0005685 A1 | 1/2007 | Chau et al. |
| 2007/0063021 A1 | 3/2007 | Chakiris et al. |
| 2007/0063052 A1 | 3/2007 | Chakiris et al. |
| 2007/0094129 A1 | 4/2007 | Graves et al. |
| 2007/0108268 A1 | 5/2007 | Graves et al. |
| 2007/0118477 A1 | 5/2007 | Graves et al. |
| 2007/0118478 A1 | 5/2007 | Graves et al. |
| 2007/0125620 A1 | 6/2007 | Sorenson et al. |
| 2007/0162338 A1 | 7/2007 | Lawe |
| 2008/0087520 A1 | 4/2008 | Molbak |
| 2008/0126211 A1 | 5/2008 | Kaufhold |
| 2008/0162299 A1 | 7/2008 | Gusler et al. |
| 2009/0018959 A1 | 1/2009 | Doran et al. |
| 2009/0178897 A1 | 7/2009 | Molbak |
| 2009/0242626 A1 | 10/2009 | Jones et al. |
| 2009/0265269 A1 | 10/2009 | Stoecker |
| 2010/0198726 A1 | 8/2010 | Doran et al. |

FOREIGN PATENT DOCUMENTS

| | | |
|---|---|---|
| CA | 2060630 | 8/1992 |
| CA | 2067987 | 11/1992 |
| CH | 680171 | 6/1992 |
| DE | 660354 | 5/1938 |
| DE | 2528735 | 9/1976 |
| DE | 3021327 | 12/1981 |
| DE | 3147603 | 6/1983 |
| EP | 0313294 | 4/1989 |
| EP | 0351217 | 1/1990 |
| EP | 0420163 | 4/1991 |
| EP | 0458610 A1 | 11/1991 |
| EP | 0477722 | 4/1992 |
| EP | 0857579 A2 | 8/1998 |
| EP | 0924662 | 6/1999 |
| EP | 0924664 | 6/1999 |
| EP | 0924665 | 6/1999 |
| EP | 1178448 | 2/2002 |
| EP | 1231579 | 8/2002 |
| EP | 1497775 A2 | 1/2005 |
| FR | 2042254 | 2/1971 |
| FR | 2342531 | 9/1977 |
| FR | 2845189 | 4/2004 |
| GB | 958741 | 5/1964 |
| GB | 1564723 | 4/1980 |
| GB | 2095452 | 9/1982 |
| GB | 2121582 | 12/1983 |
| GB | 2153128 | 8/1985 |
| GB | 2175427 | 11/1986 |
| GB | 2186411 | 8/1987 |
| GB | 2188467 | 9/1987 |
| GB | 2198274 | 6/1988 |
| GB | 2223340 | 4/1990 |
| GB | 2223872 | 4/1990 |
| GB | 2255666 | 11/1992 |
| IE | 80670 A2 | 11/1998 |
| JP | 5249892 | 4/1977 |
| JP | 5250296 | 4/1977 |
| JP | 1258092 | 10/1989 |
| JP | 1307891 | 12/1989 |
| JP | 281193 | 3/1990 |
| JP | 363795 | 3/1991 |
| JP | 392994 | 4/1991 |
| JP | 3252795 | 11/1991 |
| JP | 4315288 | 11/1992 |
| JP | 4344995 | 12/1992 |
| SE | 44244 | 9/1918 |
| SE | 44247 | 9/1918 |
| SE | 50250 | 11/1919 |
| SE | 8801851 A | 11/1989 |
| WO | WO-9406101 | 3/1994 |
| WO | WO-9409440 | 4/1994 |
| WO | WO-9530215 | 11/1995 |
| WO | WO-9626508 A1 | 8/1996 |
| WO | WO-96/30877 | 10/1996 |
| WO | WO-9825241 A2 | 6/1998 |
| WO | WO-9836521 A1 | 8/1998 |
| WO | WO-9928830 A1 | 6/1999 |
| WO | WO-9950785 | 10/1999 |
| WO | WO-0010138 | 2/2000 |
| WO | WO-0011568 | 3/2000 |

| | | | |
|---|---|---|---|
| WO | WO-0075889 A2 | 12/2000 |
| WO | WO-0139093 A1 | 5/2001 |
| WO | WO-0142945 A1 | 6/2001 |
| WO | WO-0159722 A2 | 8/2001 |
| WO | WO-0191035 | 11/2001 |
| WO | WO-0207071 | 1/2002 |
| WO | WO-0209001 A1 | 1/2002 |
| WO | WO-02/075680 | 9/2002 |
| WO | WO-03046845 | 6/2003 |
| WO | WO-03071387 A2 | 8/2003 |
| WO | WO-03071495 A1 | 8/2003 |
| WO | WO-03090020 A2 | 10/2003 |
| WO | WO-200410946 A2 | 2/2004 |
| WO | WO-2004023252 | 3/2004 |

OTHER PUBLICATIONS

U.S. Appl. No. 09/661,048, filed Sep. 14, 2000, Molbak.
U.S. Appl. No. 09/661,955, filed Sep. 14, 2000, Molbak.
U.S. Appl. No. 09/661,956, filed Oct. 30, 2001, Molbak.
U.S. Appl. No. 10/020,587, filed Sep. 14, 2000, Beach.
1-800 Gift Certificate, http://www.800giftcertificate.com, 12 pages [accessed Feb. 16. 199].
Accessories Brochure, Undated, 3 pages.
Australian Patent Office, Examiner's First Report, May 11, 1999, Australian Application No. 71948/98, 2 pages.
Business Wire [online], "Cash Goes in, Gift Certificate Comes Out-Coinstar Now Offering Gift Certificates Redeemable at Amazon.com With No Transaction Fee," Sep. 13, 2005 [Retrieved Apr. 4, 2007]. Retrieved from Internet <URL : http://companyweb/pctsrs/c1g/PCT-US%2006-44111/Coinstar_adds_Amazon_PCT-US_06-44111_PRIOR_ART.pdf>, 2 pages.
Cash, M., "Bank blends new technology with service", *Winnepeg Free Press*, Sep. 4, 1992, 1 page.
Cohen, P., "Coinstar Turns Loose Change into iTunes Songs," Yahoo News, http://news.yahoo.com/s/macworld/20060410/tc_macworld/coinstar20060410_0, Apr. 10, 2006, pp. 1-3.
European Search Report, European Application No. EP10012806, Mailed on Nov. 19, 2010, 9 pages.
Exam Report, Canadian Application No. 2,476,500, Mail Date Dec. 9, 2011, 6, pages.
Exam Report, Canadian Application No. 2,476,502, Mail Date Oct. 25, 2010, 7, pages.
Exam Report, European Application No. 03742772, Mailed on Jul. 7, 2010, 6 pages.
Examiner's Report, Australian Application No. 2006323111, Mailed on Oct. 22, 2009, 3 pages.
Examiner's Report, Canadian Application No. 2,630,352, Mailed on Oct. 15, 2009, 3 pages.
Examiner's Report, Canadian Patent Application No. 2,476,500, Mailed on Sep. 25, 2009, 5 pages.
F. Zimmerman & Co., "Reference Manual Contovit/Sortovit, Perconta Money Counting and Sorting Systems", Aug. 1995, pp. I-III, 1-31, and three pages of specifications.
First USA: First USA Introduces the Gift Card: Pre-Paid Visa Card Works Better than a Gift Certificate, Business Editors, Nov. 12, 1998.
Final Office Action for U.S. Appl. No. 11/294,637, Mail Date Aug. 9, 2011, 19 pages.
Final Office Action for U.S. Appl. No. 12/177,275, Mail Date Aug. 10, 2011, 13 pages.
Final Office Action, U.S. Appl. No. 11/294,637, Mailed on Aug. 19, 2009, 18 pages.
Final Office Action; U.S. Appl. No. 10/504,436; Mailed on Jan. 22, 2008; 12 pages.
Geldinstitute Literature, Mar. 1990 and Apr.-May 1992, 2 pages.
Gift Certificate Express, http://www.giftcertificateexpress.com, 10 pages [accessed Feb. 16, 1999].
Hamilton, "Turning Cans into Cold Cash", *The Washington Post*, Jul. 2, 1991, pp. D1, D4, 194-209.
Home Depot Gift Card [2 pages].
International Search Report and Written Opinion, International Application No. PCT/US06/44111, Mailed on Oct. 8, 2009, 11 pages.
Leitch, C., "High-tech bank counts coins," Innovations, Report on Business, Sep. 18, 1991, 1 page.
Llemeon, J., "Royal's Burlington drive-in bank provides customers 24-hour tellers," *Business Today, The Toronto Star*, Aug. 21, 1991, 1 page.
NCR, "NCR 7401 Retail Self-Service Solution," 2 pages.
NCR, "NCR 7800 Consumer Price Verifier," http://www3.ncr.com/product/retail/product/catalog/7800.shtml, pp. 1-2 [accessed Mar. 18, 1999].
Non-Final Office Action for U.S. Appl. No. 10/228,907, Mail Date Dec. 8, 2011, 12 pages.
Non-Final Office Action for U.S. Appl. No. 10/504,437, Mail Date Apr. 15, 2010, 12 pages.
Non-Final Office Action for U.S. Appl. No. 10/504,438, Mail Date Jun. 9, 2011, 14 pages.
Non-Final Office Action for U.S. Appl. No. 10/558,907, Mail Date Jun. 8, 2011, 15 pages.
Non-Final Office Action for U.S. Appl. No. 12/647,594, Mail Date Mar. 28, 2011, 9 pages.
Non-Final Office Action, U.S. Appl. No. 10/504,437, Mailed on Jul. 22, 2009, 22 pages.
Non-Final Office Action, U.S. Appl. No. 10/504,438, Mailed on Dec. 1, 2009, 11 pages.
Non-Final Office Action, U.S. Appl. No. 10/558,907, Mailed on May 12, 2009, 32 pages.
Non-Final Office Action; U.S. Appl. No. 10/504,436; Mailed on Feb. 25, 2009; 32 pages.
Non-Final Office Action; U.S. Appl. No. 10/504,436; Mailed on Jun. 18, 2007; 11 pages.
Non-Final Office Action; U.S. Appl. No. 10/504,436; Mailed on Aug. 11, 2008; 19 pages.
Non-Final Office Action; U.S. Appl. No. 10/504,437; Mailed on Sep. 19, 2007; 23 pages.
Non-Final Office Action; U.S. Appl. No. 10/504,437; Mailed on Oct. 29, 2008; 16 pages.
Non-Final Office Action; U.S. Appl. No. 10/504,438; Mailed on Jan. 16, 2008; 7 pages.
Non-Final Office Action; U.S. Appl. No. 10/504,438; Mailed on Feb. 20, 2009; 9 pages.
Non-Final Office Action; U.S. Appl. No. 11/230,310; Mailed on Jun. 27, 2008; 9 pages.
Non-Final Office Action; U.S. Appl. No. 11/294,637; Mailed on May 16, 2008; 7 pages.
Non-Final Office Action; U.S. Appl. No. 11/294,637; Mailed on Dec. 12, 2008; 10 pages.
Notice of Allowance, U.S. Appl. No. 10/504,436, Mailed on Nov. 4, 2009, 25 pages.
Notice of Allowance, U.S. Appl. No. 10/504,437, Mailed Oct. 19, 2010, 18 pages.
Notice of Allowance, U.S. Appl. No. 12/647,594, Mailed Oct. 19, 2010, 38 pages.
Notice of Allowance, U.S. Appl. No. 13/213,421, Mailed Jan. 17, 2012, 13 pages.
Oxby, M., "Royal Bank opens 'super branch'", *The Gazette Montreal*, Sep. 14, 1991, 1 page.
Reis Eurosystems Geldbearbeitungssysteme, "Test-Programme CS 3110 Selectronic coin sorting and counting machine", Jul. 1992, pp. 1-3.
Reis Eurosystems, "Operating Instructions CS 3110 Selectronic Coin Sorting and Counting Machine With Central Sensor", Jul. 1992, pp. 1-12, I-IV.
Sheehan, Michael, "Marriage of Convenience," 3 pageshttp://www.kioskbusiness.com/NovDec01/articles/article4.html [accessed May 19, 2003].
Scan Coin AB's Answers to Coinbank's First Set of Interrogatories (Nos. 1-13), executed on Nov. 3, 1997, 15 pages.
Scan Coin AB, 1989, Jagershillgatan 26, S-213, 75 Malmo, Sweden, Technical Referens Manual, Cds Coin Deposit System, pp. 3-93, odd pages only.
Scan Coin CDS 640 Cash Deposit System Brochure, 2 pages.
Scan Coin CDS Cash Deposit System, Undated, 2 pages.
Scan Coin CDS Munzgeldeinzahlungen in Selbstbedienung: Cash Deponier System CDS 500, 1994, 6 pages.

Scan Coin International Report, Apr. 1987, 49 pages.
Scan Coin Money Processing Systems, Oct. 1, 1988, 10 pages.
Scan Coin Newsletter, May 1991, 2 pages.
Scan Coin Sales Invoices for Coin Counters in the United States, 1989-1993, 29 pages.
Scan Coin Technical Manual CDS MK 1 Coin Deposit System; 1991, 98 pages.
Scan Coin Technical Manual SC 102 Value Counter, Undated, 28 pages.
Scan Coin Technical Reference Manual CDS Coin Deposit System (odd pages only) 1989, 47 pages.
Scan Coin World Newsletters, Scan Coin AB, Jagerhillgatan 26, S-213 75 Malmo, Sweden, 1988-1990, 12 pages.
Scan Coin correspondence regarding supermarkets, Sep. 11, 1992, 4 pages.
Slide Changing Apparatus With Slide Jam Protection, Research Disclosure 30509, Sep. 1989.

Spectrum One, "Spectrum One? Network Solutions for Wireless Data Capture," httpl/www.symbol.com/ST0000129.htm, pp. 1-5 [accessed Mar. 18, 1999].
Super Branch Literature, Feb. 1992, 2 pages.
Supplementary European Search Report, European Application No. 03742771, Mailed on Mar. 29, 2010, 3 •pages.
Supplementary European Search Report, European Application No. 03742772, Mailed on Mar. 29, 2010, 4 pages.
Supplementary European Search Report, European Application No. 03742774, Mailed on Mar. 29, 2010, 3 pages.
Symbol Technologies, Inc., "PriceChecker System," 2 pages.
Symbol Technologies, Inc., "Spectrum One? SAB-Lite'?," 2 pages.
SymbolSolutions, "Supermarket Buys Two Solutions for the Price of One," http://www.symbol.com/solution/017SS.htm, pp. 1-3 [accessed Mar. 18, 1999].

* cited by examiner

METHODS AND SYSTEMS FOR EXCHANGING/TRANSFERRING GIFT CARDS

CROSS-REFERENCE TO RELATED APPLICATION(S)

This application is divisional of U.S. patent application Ser. No. 12/758,677, filed Apr. 12, 2010, which is a continuation of U.S. patent application Ser. No. 12/647,594, filed Dec. 28, 2009, which is a continuation of U.S. patent application Ser. No. 10/504,436, now U.S. Pat. No. 7,653,599, which is a U.S. national phase application of PCT/US03/04603, filed Feb. 14, 2003, which claims priority to the following U.S. Provisional Patent Applications: U.S. Provisional Patent Application No. 60/357,331, filed Feb. 15, 2002; U.S. Provisional Patent Application No. 60/357,555, filed Feb. 15, 2002; U.S. Provisional Patent Application No. 60/419,735, filed Oct. 18, 2002; and U.S. Provisional Patent Application No. 60/424,377, filed Nov. 6, 2002. This application incorporates all of the patent applications listed above in their entireties by reference.

TECHNICAL FIELD

This application relates generally to methods and systems for exchanging one form of value for another form of value and, more particularly, to methods and systems for transferring value to an account, or for providing or reloading prepaid cash cards, credit cards, phone cards, event tickets, and the like.

BACKGROUND

Various vending machines are configured to dispense selected products to users in exchange for exact amounts of money. Such machines include, for example, food dispensing machines, stamp dispensing machines, ticket dispensing machines, and the like. Other machines are configured to count arbitrary numbers and denominations of coins received from users. One such coin-counting machine is disclosed in U.S. Pat. No. 5,620,079 to Molbak ("the '079 patent to Molbak"), which is incorporated herein in its entirety by reference. In one embodiment, the Molbak coin-counting machine can dispense a redeemable voucher to a user for an amount related to the value of coins received from the user. This redeemable voucher can be redeemed for cash or merchandise at, for example, a point-of-sale (POS) location in the retail outlet where the machine is located.

Machines also exist for dispensing prepaid telephone cards to users. Such machines typically dispense a selected phone card to a user after the user has deposited a requisite amount of money in the machine. In addition, prepaid long-distance accounts and wireless cell phone accounts also exist whereby a service carrier maintains an account of available minutes for each individual user. Such accounts are often rechargeable and are associated with individual personal identification numbers (PINs). To start an account, a user may initially purchase a phone card containing, for example, sixty minutes of long-distance telephone usage. The number of available minutes are depleted as the user makes phone calls via the account. Some accounts allow the user to add minutes to his/her account by paying for additional time with, for example, a credit card. In this way, the user is able to add minutes to his/her account as the need arises, or to fit their particular budget.

Other methods exist by which customers can purchase prepaid credit cards. In one such method, a customer gives a cashier at a POS sufficient funds to cover the value of a prepaid credit card and any additional service fees charged by the retail outlet. In return for the funds, the cashier provides the customer with a receipt that includes a unique identification number and the telephone number of a credit card issuer. The customer then calls the telephone number and provides the credit card issuer with the identification number from the receipt and certain other personal information. Such personal information can include the customer's mailing address and/or the customer's social security number. The credit card issuer then provides a credit card account number to the customer over the telephone. The customer can begin using this number for credit card purchases immediately by telephone, mail, or the Internet. The credit card issuer also mails an embossed credit card to the customer that the customer can begin using as soon as it arrives.

DETAILED DESCRIPTION

Figure 1:
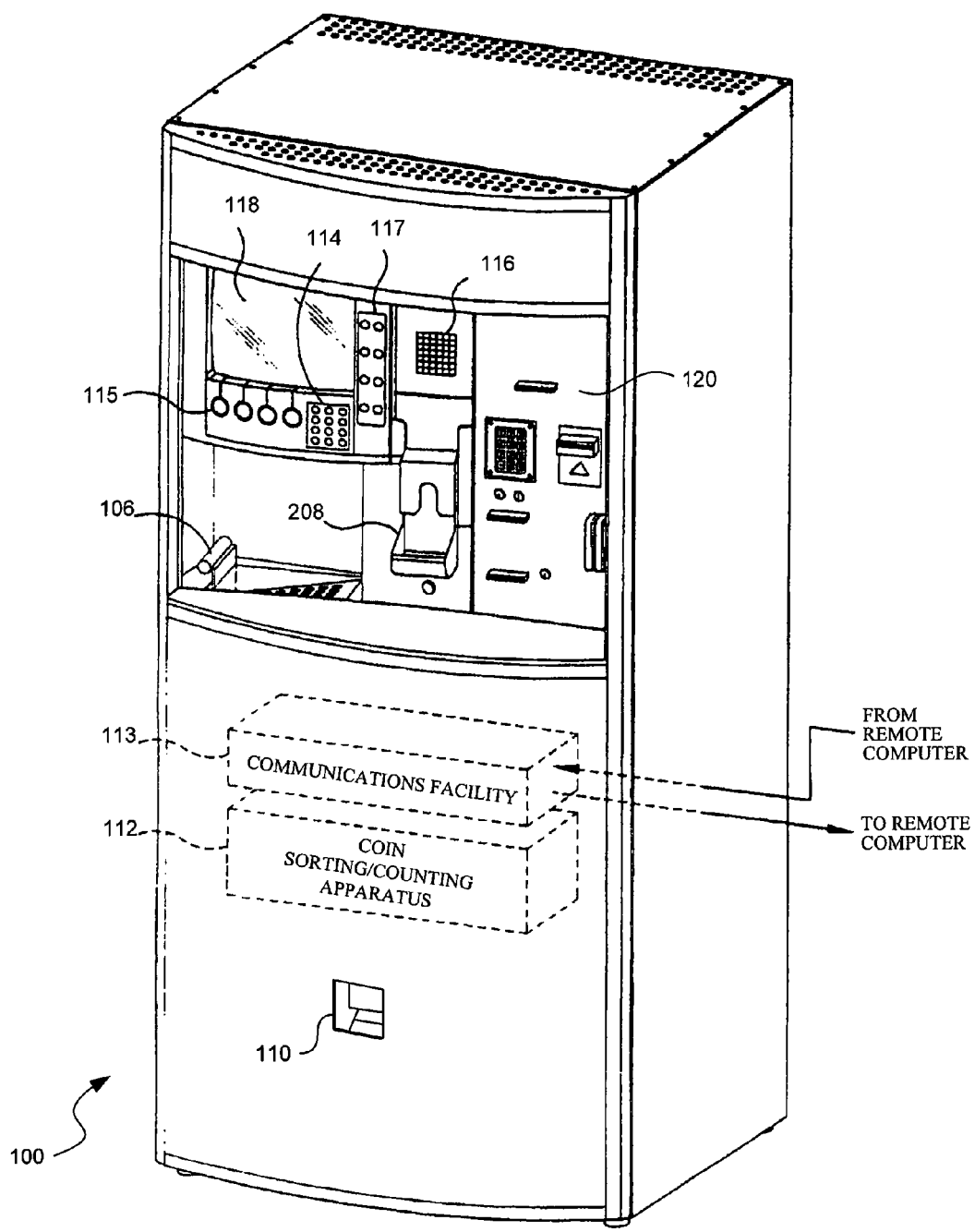
FIG. 1 is a partially schematic isometric view of a value exchange machine configured in accordance with an embodiment.

This application incorporates the following U.S. patents in their entireties by reference: U.S. Pat. Nos. 5,746,299; 6,047,808; 5,988,348; 6,196,371; 6,116,402; 6,349,972; and 5,909,793.

This application further incorporates the following co-pending U.S. patent applications in their entireties by reference: U.S. patent application Ser. No. 09/661,956, filed Sep. 14, 2000; U.S. patent application Ser. No. 09/662,414, filed Sep. 14, 2000; U.S. patent application Ser. No. 09/661,955, filed Sep. 14, 2000; U.S. patent application Ser. No. 09/661,048, filed Sep. 14, 2000; and U.S. patent application Ser. No. 10/020,587, filed Oct. 30, 2001.

The following disclosure describes methods and systems for converting one form of value into another form of value. "Value," as used herein, means anything of monetary worth, such as money, credit, time (e.g., long-distance or cell phone minutes), event and travel tickets, merchandise, and the like. Further, as used throughout this disclosure, the term "card" shall be understood to include both prepaid and non-prepaid cards, unless the particular context requires otherwise. The term "prepaid card" can refer to any instrument useable in commerce in place of money, or any instrument that entitles the bearer to acquire, utilize, or exhaust any commercially available product or service. Examples of prepaid cards in this context include prepaid credit cards, prepaid cash cards, stored-value cards, in-store credit cards, gift cards, prepaid phone cards, payroll cards, and the like. Throughout this disclosure, for ease of reference the term "prepaid cash card" will be understood to include at least prepaid cash card, prepaid credit card, and stored-value card. Examples of "non-prepaid" cards can include conventional credit cards, and the like. Such prepaid and non-prepaid cards typically include at least one of a readable magnetic stripe, bar code, computer/memory chip, smart card chip, and the like.

In one embodiment, the system described herein can receive a random plurality of coins from a user, count the coins, and, if the user desires, dispense a prepaid card to the user having a value related to the total value of the coins received. This prepaid card may then be used by the user, or another person authorized by the user, to pay for goods and/or services at a variety of different retail locations. In another embodiment, the system disclosed herein can dispense a prepaid card to a user in return for loose coins, paper currency, and/or a valid credit card account number that is provided by the user. In a further embodiment, a user may apply value from an existing prepaid card to purchase another prepaid card. In yet another embodiment, the system disclosed herein can dispense a prepaid card to a user in return for funds debited from a financial institution account (e.g., a savings, checking account, or brokerage account) that is provided by the user. In yet another embodiment, a user may utilize any of the foregoing methods of payment to "top up" (i.e., to "reload," "recharge," or otherwise increase the value of) an existing prepaid card. Thus, in accordance with embodiments of the invention, a user can purchase or top up a prepaid card with 1) cash (loose coins and/or currency); 2) credit (e.g., credit cards, check cards, etc.); 3) debit (e.g., debit cards, ATM cards, etc.); 4) existing prepaid cards; 5) bank account funds; or 6) any combination of the above.

The present disclosure, however, is not limited to methods and systems for dispensing prepaid cash cards and phone cards to users. To the contrary, embodiments of the methods and systems disclosed herein can also include dispensing tickets (such as event and travel tickets), novelty items, and redeemable vouchers to users in return for the various forms of payment discussed above. In addition, embodiments of the methods and systems disclosed can also include providing account information to users, such as balance information regarding a particular credit card account, phone card account, on-line account, and the like.

Further, the methods and systems described herein can also be used to transfer funds to an account of a user, to an account of another person, from an account of the user, and/or from an account of another person. Such transactions may include, for example, transferring value to or from a bank account, a brokerage account, a credit card account, long distance phone card account, an on-line payment account, a virtual account, and/or a virtual "e wallet." As used herein, the term "account" shall be taken to mean at least the foregoing types of accounts, unless the particular context contradicts such an interpretation. In such transactions, the user may receive a receipt documenting the transaction instead of a card. In one such transaction, the user can utilize any of the methods of payment described above to transfer money from one account to another account (e.g., for a person-to-person payment or for bill payment). Similarly, the user may also elect to transfer the proceeds from any such payment to a bank account for direct deposit, to a cell phone account to obtain additional minutes, or to an on-line account (e.g., an "e-wallet") for on-line purchases.

Certain embodiments of the methods and systems described herein for exchanging one form of value for another form of value are described in the context of computer-executable instructions performed by a general-purpose computer. For example, in one embodiment these computer-executable instructions are stored on a computer-readable medium, such as a floppy disk or CD-ROM. In other embodiments, instructions are stored on a server computer system and accessed via a communications link or a computer network, such as an intranet, the Internet, or another computer network. Because the basic structures and functions related to computer-readable routines and corresponding implementations are known, they have not been shown or described in detail here in order to avoid unnecessarily obscuring the described embodiments.

Certain specific details are set forth in the following description and in FIGS. 1-9 to provide a thorough understanding of various embodiments of the invention. Those of ordinary skill in the relevant art will understand, however, that the invention may have additional embodiments which may be practiced without several of the details described below. In other instances, those of ordinary skill in the relevant art will appreciate that the methods and systems described can include additional details without departing from the spirit or scope of the disclosed embodiments. In addition, some well-known structures and systems often associated with card dispensing apparatuses and methods and associated computer networks have not been shown or described in detail below to avoid unnecessarily obscuring the description of the various embodiments of the invention.

In the figures that follow, identical reference numbers identify identical or at least generally similar elements. To facilitate the discussion of any particular element, the most significant digit or digits in any reference number refers to the figure in which that element is first introduced. For example, element 120 is first introduced and discussed with reference to FIG. 1. In addition, any dimensions, angles and other specifications shown in the figures are merely illustrative of particular embodiments of the invention. Accordingly, other embodiments of the invention can have other dimensions, angles and specifications without departing from the spirit or scope of the present disclosure.

FIG. 1 is a partially schematic isometric view of a value exchange machine 100 configured in accordance with an embodiment. In one aspect of this embodiment, the machine 100 includes a coin input region or tray 106, a voucher outlet 108, a coin return 110, a coin sorting/counting apparatus 112 (shown schematically), and a communications facility 113 (also shown schematically). The machine 100 can further include various user-interface devices, such as a first keypad 114, user-selection buttons 115, a speaker 116, a display screen 118, and a touch screen 117. In another aspect of this embodiment, the foregoing features of the value exchange machine 100 can be at least generally similar in structure and function to one or more of their counterparts as described in the '079 patent to Molbak. Accordingly, these features can be utilized in various embodiments as described in the '079 patent to Molbak to provide a redeemable cash voucher to a user in return for coins deposited by the user in the coin tray 106. In other embodiments, the machine 100 can have other features in other arrangements without departing from the spirit or scope of the present invention. As described in greater detail below, the machine 100 can also include a drawer assembly 120 that has additional value exchange functionalities.

Figure 2:
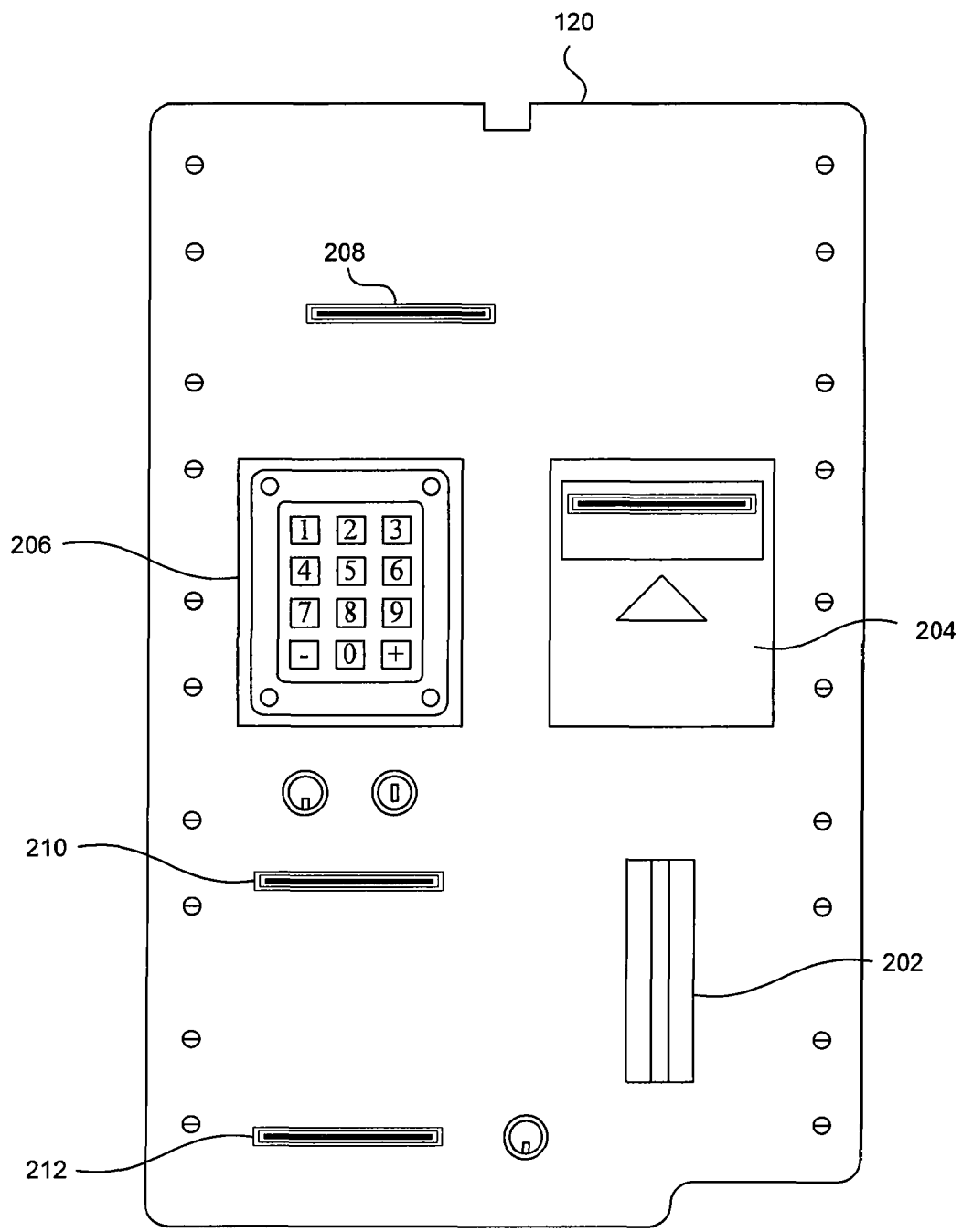
FIG. 2 is an enlarged front elevation view of a drawer assembly of the value exchange machine of FIG. 1 configured in accordance with an embodiment.

FIG. 2 is an enlarged front elevation view of the drawer assembly 120 of FIG. 1 configured in accordance with an embodiment. In an aspect of this embodiment, the drawer assembly 120 includes a card reader 202, a bill acceptor 204, and a second keypad 206 (which may be encrypted). The bill acceptor 204 can be configured to receive paper currency (referred to herein simply as "currency"). The card reader 202 can be configured to read all forms of data storage media typically found on wallet-sized cards, such as conventional credit cards, debit cards, smart cards, and the like. In addition, in some embodiments, the card reader 202 can also be configured to write data to suitable data storage media typically found on such cards. Such data storage media can include one or more of magnetic stripes, bar codes, smart chips, and the like. The second keypad 206 can be used to enter information often associated with such cards, including a PIN.

In addition to the foregoing user-interface devices, the drawer assembly 120 can also include a number of output devices. For example, the drawer assembly 120 can include a card outlet 208, a ticket outlet 210, and a receipt outlet 212. In the illustrated embodiment, the card outlet 208 is a horizontal slot for dispensing cards, such as prepaid cash or phone cards, and other similar items. The ticket outlet 210 of the illustrated embodiment can be a similar horizontal slot for dispensing travel or event tickets, such as airline tickets or tickets for a basketball game or a concert. As described in greater detail below, in one embodiment these tickets may have been reserved, ordered, or prepurchased on-line by a user over the Internet.

While the aspects and features of the drawer assembly 120 discussed above are representative of those that may be included as components of the value exchange machine 100 of FIG. 1, those of ordinary skill in the relevant art will understand that additional features may be included without departing from the spirit or scope of the present disclosure. For example, although the drawer assembly 120 of the illustrated embodiment is shown with only one card outlet 208 and one ticket outlet 210, in other embodiments more card and ticket outlets may be included, depending on the particular application of the machine 100. Furthermore, in yet other embodiments one or more of the foregoing features may be omitted from the value exchange machine 100 in various applications without departing from the spirit or scope of the present disclosure.

Use of the value exchange machine 100 to exchange one form of value for another form of value will now be explained in accordance with a few examples. Referring to FIG. 1, in one embodiment transaction options are displayed for a user on the display screen 118, and can include one or more of purchasing a prepaid cash card; purchasing a prepaid phone card; transferring money to an account; topping up an existing credit card account, cash card account, long distance phone card account, or wireless account; receiving a redeemable cash voucher, and/or performing other transfers or purchasing other items. The user can select the desired transaction or transactions by using the first keypad 114, the touch screen 117, and/or one or more of the selection buttons 115 in response to prompts shown on the display screen 118. If the user selects, for example, to purchase a prepaid cash card, then the machine 100 prompts the user to input his/her preferred payment option. In one embodiment, the user can elect to pay with coins and can deposit a plurality of randomly oriented coins into the tray 106 and hingeably rotate the tray 106 upwardly to deliver the coins to the coin sorting/counting apparatus 112. The coin sorting/counting apparatus 112 then counts the coins and displays the total to the user on the display screen 118. If the user accepts this total and, if applicable, any related service fees, then the machine 100 prompts the user to indicate how much of the total the user wishes to put on the prepaid cash card. Once the user has input this value, the machine 100 dispenses the prepaid cash card to the user via the card outlet 208, assuming the user deposited enough money to cover the requested value. If any funds are left over from the transaction, the machine can issue a redeemable cash voucher to the user for the difference. Alternatively, the user can apply the remaining funds toward another card or service, or transfer the remaining funds to an account, such as a checking or savings account.

In another embodiment, a user may desire to purchase a prepaid cash card with an existing credit card. In this embodiment, the user swipes the existing credit card through the card reader 202 (FIG. 2). After reading the card, the machine 100 prompts the user to input a PIN or other security code via the second keypad 206. Next, the machine 100 prompts the user to enter the desired dollar amount of the new prepaid cash card via the first keypad 114. After authorizing the transaction (by communicating, for example, with a remote bank via the communications facility 113), the machine 100 dispenses the new prepaid cash card to the user via the card outlet 208. In a further embodiment, the user can pay for a prepaid cash card at least in part by depositing a sufficient number of bills into the bill acceptor 204.

In yet another embodiment, a user can purchase a prepaid credit card with the machine 100 as follows. First, the user uses the touch screen 117, the first keypad 114, and/or the user-selection buttons 115 to select the prepaid credit card purchase option. In one aspect of this embodiment, the customer then deposits payment by inserting paper currency into the bill acceptor 204, depositing coins into the coin tray 106 and rotating the tray upwardly to deliver the coins, and/or by swiping a debit or credit card through the card reader 202. In other embodiments, the customer can deposit payment in other ways. For example, in other embodiments, the machine 100 may have a coin input feature that differs from the rotatable coin tray 106 without departing from the present disclosure. After confirming receipt of the funds, the machine 100 dispenses a receipt or other media (card facsimile, etc.) to the customer from the receipt outlet 212.

In one aspect of this embodiment, the receipt includes instructions directing the user to call a particular telephone number and activate their new prepaid credit card account. Per the instructions, the user calls the telephone number and activates his/her account by providing certain personal information, such as name and mailing address. The user then receives a unique number (such as a 16-digit number for their new prepaid credit card account) from the credit card account issuer over the telephone. The user can use this number immediately for credit-based purchases either by telephone, mail, or the Internet. Further, within a few days, the user receives a personalized, embossed prepaid credit card via the mail that can be used anywhere the particular prepaid credit card is accepted. In addition, the user can also have the option of attaching a PIN to their new prepaid credit card account that will allow them to make cash withdrawals at ATMs.

In a slightly different embodiment, a user can purchase a prepaid credit card with the machine 100 as follows. First, the user uses the touch screen 117, the keypad 114, and/or the user-selection buttons 115 to select the purchase of a prepaid credit card. The user then deposits payment by, for example, inserting paper currency into the bill acceptor 204, depositing coins into the coin tray 106, and/or by swiping a debit or credit card through the card reader 202. After confirming receipt of payment, the machine 100 dispenses the prepaid credit card to the user from the card outlet 208. In this embodiment, the card can be used immediately anywhere the particular prepaid credit card is accepted.

In a further embodiment, a user can use the machine 100 to "reload" or add funds to a card (e.g., a cash, credit, or stored-value card). In this embodiment, the user utilizes the touch screen 117, the first keypad 114, and/or the user-selection buttons 115 to select the "reload" or "recharge" transaction, then swipes the card they would like to reload through the card reader 202. The user then deposits payment for the reload amount using coin, currency, and/or credit as described above. After confirming the receipt of funds, the machine 100 dispenses a receipt to the user via the receipt outlet 212. The funds received from the user are then credited to the desired card (or associated account), and are available for use immediately or within a relatively short time. In this embodiment and the previous embodiment, the user is not required to place a telephone call to a third-party service, such as a prepaid credit card account issuer, to activate the account.

As mentioned above, a prepaid cash card is only one form of "value" that can be output by the machine 100 in return for various forms of monetary exchange provided by a user. For example, in other embodiments the machine 100 can output tickets from the ticket outlet 210 or prepaid phone cards from the card outlet 208 after receiving sufficient funds via one or more of the card reader 202, the bill acceptor 204, or the coin input tray 106.

In yet another embodiment, a user may elect to use any of the fund input methods discussed above to electronically transfer money. In such transactions, the user may not receive a card having a value. Instead, the user may receive a receipt or other record documenting the transaction. For example, in one such transaction the user can utilize any of the methods of payment described above to transfer money to his or her account (e.g., a savings, checking, or credit card account) or to an account of another person (e.g., for a person-to-person payment or for a bill payment). Similarly, the user can also elect to transfer the proceeds from any such payment to a bank account for direct deposit, to a cell phone account (e.g., for long-distance telephone minutes), or to an on-line account (e.g., an "e-wallet") for on-line purchases.

In a further embodiment, a user can top up a phone account (e.g., a long distance calling card account or a wireless account) with the machine 100. In one aspect of this embodiment, the display screen 118 can present or display a prompt or menu to the user asking if he or she would like to top up their phone card account. If so, the user selects his or her carrier and/or enters the corresponding account number or phone number. (In another embodiment, the user can swipe his/her card through the card reader 202 to have the account number read from the card.) For a PIN-based transaction, the user selects a predefined dollar amount to add to his/her account and then deposits money or other funds into the machine 100 in one of the ways described above. For example, in one embodiment, the user can deposit currency via the bill acceptor 204. In another embodiment, the user can deposit coins via the coin tray 106. After depositing the funds, the user receives a printout or receipt with a PIN via the receipt outlet 212. The user then calls the carrier and enters the PIN to activate the additional minutes added to his/her account. In another embodiment, the user has the option of selecting either a predefined dollar amount of minutes or entering a specific dollar amount he/she wishes to add to his/her account. In this embodiment, once the user has inserted his or her payment, the user receives a receipt confirming the transaction and the funds are immediately credited to the user's phone card account. As will be appreciated by those of ordinary skill in the relevant art, in other embodiments the machine 100 can be used in other ways to purchase or top up cards or associated accounts without departing from the spirit or scope of the present disclosure.

Figure 3:
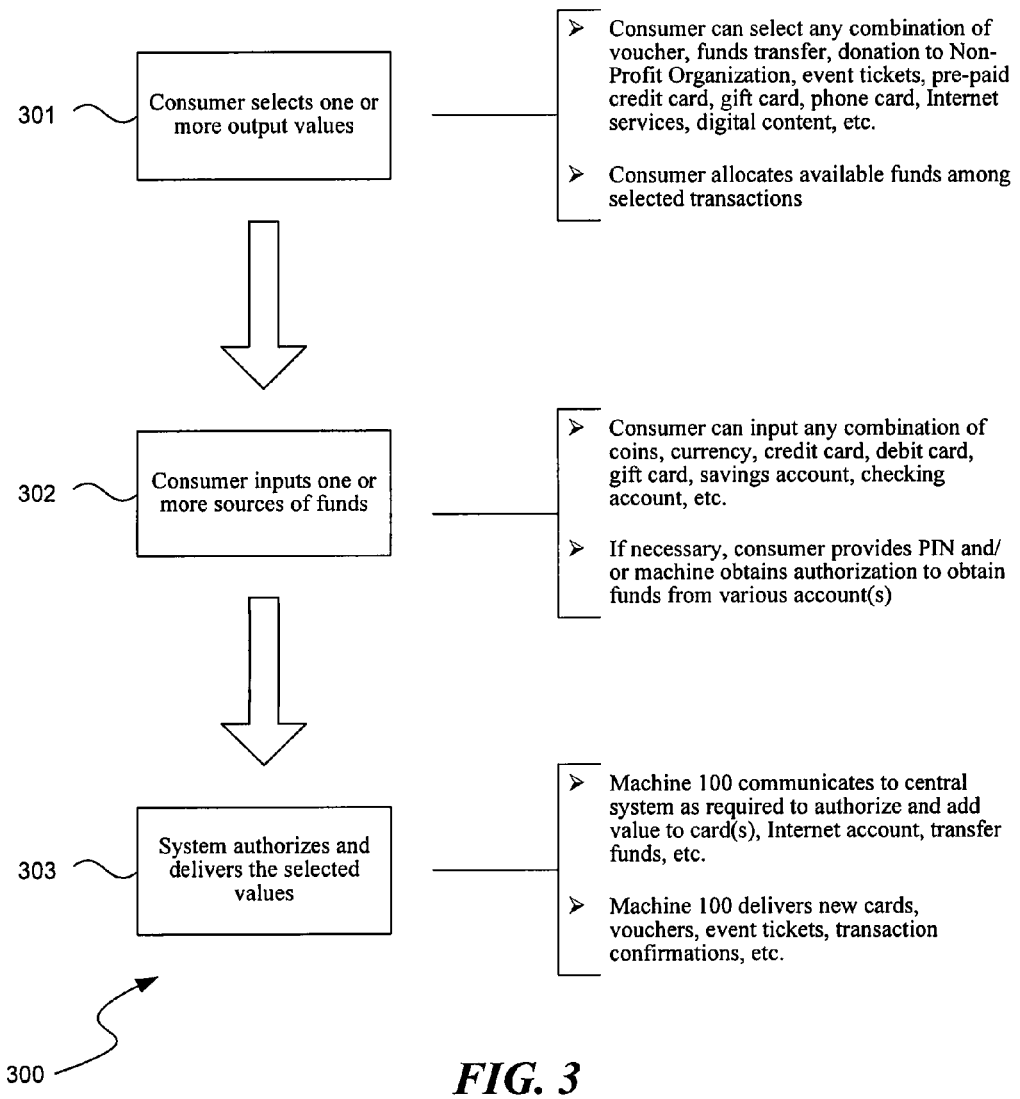
FIG. 3 is a flow diagram illustrating a routine for exchanging various forms of value using the value exchange machine of FIG. 1.

FIG. 3 is a flow diagram illustrating a routine 300 for exchanging various forms of value with the value exchange machine 100 of FIG. 1. In block 301, the user selects one or more forms of value desired as output. For example, a user can select any combination of redeemable cash voucher, prepaid cash card, gift card, phone card, ticket or other merchandise, etc. In addition or alternatively, the user may elect to transfer funds to or from an existing account, for example, to pay off a credit card balance; to increase funds in a checking, savings, or brokerage account; to add time to a long distance account; for a person-to-person payment; or for an "e-wallet." Similarly, the user may elect to "top up" an existing prepaid cash card or cell phone account with additional value or minutes, respectively. Further, the user may elect to donate any portion of the deposited value to a nonprofit organization.

In block 302, the machine 100 accepts one or more types of funds from the user. As explained above, funds can include any combination of coins, currency, credit card, debit card, gift card, existing prepaid cash card or phone card, etc. If a credit card is used for payment, the machine 100 validates the credit card and obtains authorization to debit the funds from the credit card account or accounts. In one embodiment, this is accomplished by communication between the machine 100 and one or more remote computers via the communications facility 113. The remote computers can access one or more financial institutions that control the authorization and debiting/crediting of credit card accounts. In block 303, the machine 100 receives authorization for the desired transaction(s) from the remote computers and dispenses the new form of value (e.g., a prepaid cash card, phone card, redeemable cash voucher, cash, event tickets, and/or associated transaction confirmation numbers) to the user. If the transaction involved topping up an existing card, then the user receives confirmation that the value associated with the card has been increased. Similarly, if the transaction involved a transfer of money to an account, then the user receives confirmation that the transfer has occurred.

Figure 4:
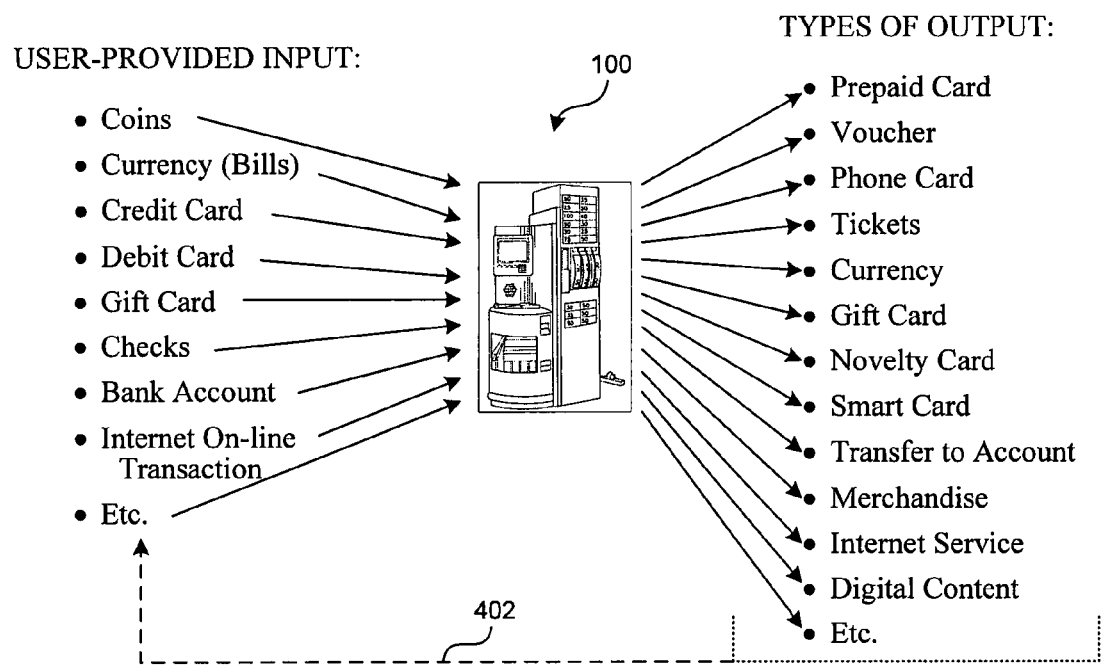
FIG. 4 is a diagram illustrating various forms of value exchangeable using the value exchange machine of FIG. 1.

FIG. 4 is a diagram illustrating the various forms of value that are exchangeable with the value exchange machine 100 in accordance with an embodiment. User-provided inputs are shown on the left side of FIG. 4 and can include coins, currency, or credit from cash cards, credit cards, debit cards, gift cards, bank account transfers, brokerage account transfers, on-line transactions, and the like. Outputs from the machine 100 are shown on the right side of FIG. 4 and can include prepaid cards (e.g., cash and credit cards), redeemable vouchers, phone cards, tickets (e.g., event tickets or travel tickets), currency (e.g., leftover change from a transaction), gift cards (e.g., gift certificates), novelty cards (e.g., baseball cards or similar items), smart cards (e.g., stored-value cards that contain a record of monetary value on the card itself), and/or account transfers. Input to the machine 100 may include any combination of the inputs shown in FIG. 4, and output may include any combination of the outputs shown in FIG. 4. In other embodiments shown by the dotted line 402 in FIG. 4, one or more of the listed outputs may also be used as inputs. For example, in one other embodiment a user can convert a prepaid card to cash by surrendering the card to the machine or by swiping the card and instructing the machine to dispense either cash or a redeemable voucher equivalent to the value remaining on the card. In a further embodiment, a user can transfer money from a bank account to a card.

In yet other embodiments, a user can access account information with the machine 100. For example, in one aspect of this embodiment, the user can swipe a card and determine the amount of funds (or phone minutes in the case of phone cards) remaining on the card or in an associated account. In all the foregoing embodiments, the operator of the value exchange machine may elect to charge the user a fee for performing the desired transaction.

FIGS. 5-9 and the associated discussion provide a brief, general description of a suitable computing environment in which aspects of the invention can be implemented. Although not required, embodiments of the invention are described in the general context of computer-executable instructions, such as routines executed by a general purpose computer (e.g., a server or personal computer). Those of ordinary skill in the relevant art will appreciate that aspects of the invention can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers, and the like. Further, aspects of the invention can be embodied in a special-purpose computer or data processor that is specifically programmed, configured, or constructed to perform one or more of the computer-executable instructions described in detail below. Indeed, the term "computer," as used generally herein, refers to any of the above-mentioned devices, as well as any data processor. In addition, throughout the discussion that follows, the term "web site" or similar will be understood to include, where required by the context, the associated server computer, databases, and other known structures and functions required to implement a web site.

Figure 5:
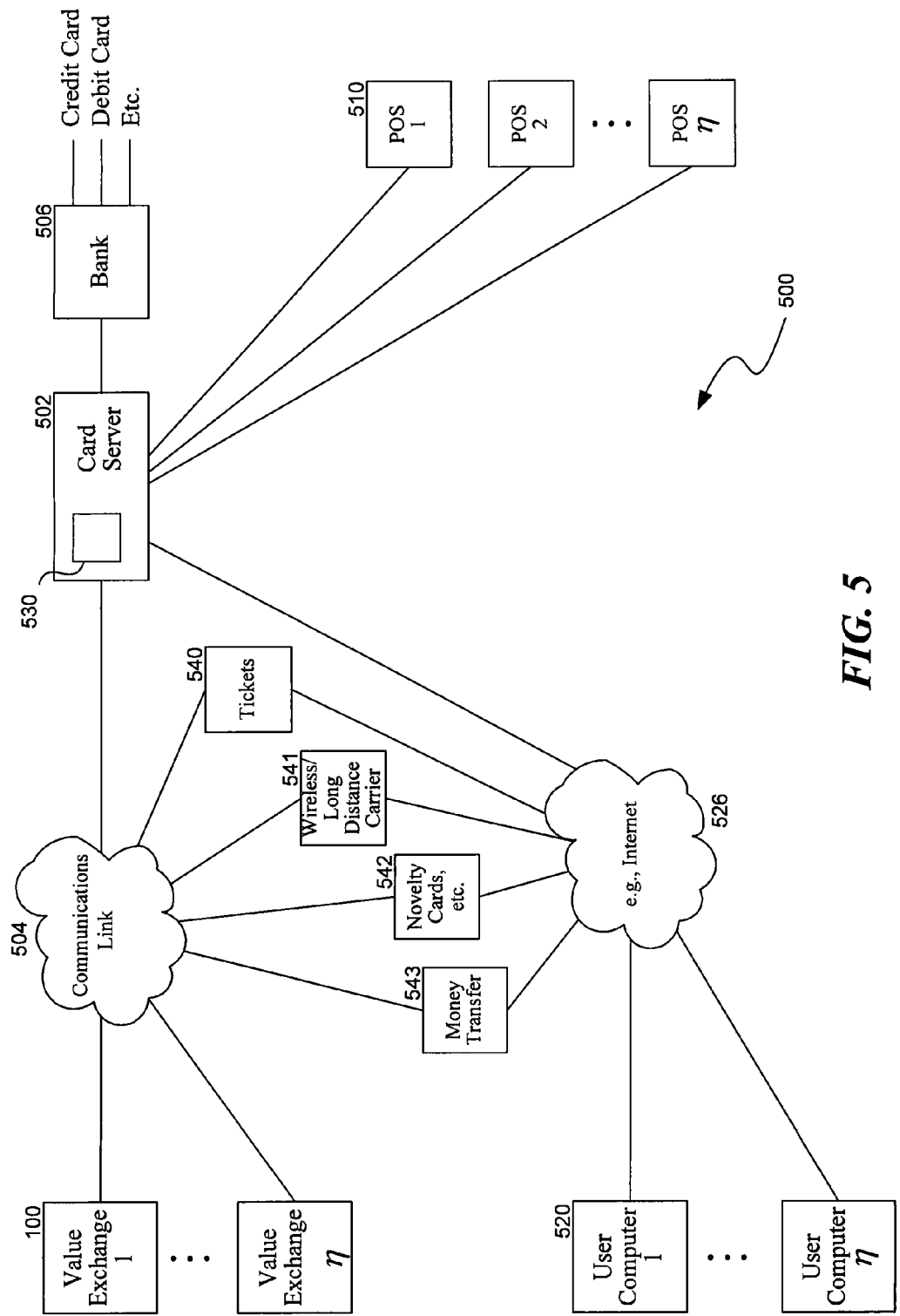
FIG. 5 is a block diagram illustrating components of a value exchange system configured in accordance with an embodiment.

FIG. 5 is a block diagram illustrating components of a value exchange system 500 configured in accordance with an embodiment. In one aspect of this embodiment, one or more value exchange machines 100 are connected to a server computer 502 via a first communications link 504. The value exchange machines 100 of this embodiment can be at least generally similar to the value exchange machine 100 discussed above with reference to FIGS. 1-4. The first communications link 504 may be a radio frequency (RF) communications link (e.g., wireless communications link), a modem, a computer network (such as a local area network (LAN)) an intranet, or the Internet. In another aspect of this embodiment, the first communications link 504 can also include or be associated with a "host" computer that receives communications from the value exchange machine(s) 100 and sends corresponding communications to appropriate recipient computers to carry out various aspects of the value exchange system 500.

In a further aspect of this embodiment, the server computer 502 is connected to a financial institution computer 506. The financial institution computer 506 can be configured to facilitate the electronic transfer of funds between various financial accounts and/or institutions. For example, the financial institution computer 506, in one embodiment, can communicate with a credit card institution to facilitate the debiting and crediting of a credit card account. In other embodiments, the financial institution computer 506 can communicate with a bank, credit union, or brokerage firm to facilitate the debiting and crediting of various types of accounts typically found in such institutions. Similarly, in another embodiment, the financial institution computer 506 can communicate with a prepaid card-issuing institution to facilitate management of prepaid card accounts. In another aspect of this embodiment, the server computer 502 can be connected to one or more POS computers 510. The POS computers 510 can be located at retail outlets where users of the value exchange machine(s) 100 use their prepaid cash or credit cards to pay for goods and/or services.

In one embodiment, a user wishing to purchase, for example, a prepaid cash card, visits one of the value exchange machines 100 at, for example, a retail outlet, and selects the desired transaction. If the user wishes to purchase the prepaid card using an existing credit card, the user "swipes" the existing credit card through the card reader 202 (FIG. 2) on the machine 100. After the user has entered any necessary codes or PINs, transaction information routes via the first communications link 504 to the server computer 502. The server computer 502 can then communicate with the financial institution computer 506 to authorize the transaction on the user's credit card account. If the financial institution computer 506 validates the transaction, it sends an authorization to the machine 100 to issue the user a prepaid cash card for the desired amount. In one aspect of this embodiment, in response to receiving the authorization, a card dispenser positioned within the machine 100 receives a card from an associated card hopper, reads an identification number off the card, and dispenses the card to the user. The machine 100 sends the card number to the server computer 502, and the server computer 502 updates a database with the card number and the associated value of the card, noting that that particular card is now active for usage. In this example, the server computer 502 can receive both card purchase transaction data and card "top up" transaction data originating from the machine 100.

In another aspect of this embodiment, a card value (e.g., dollar value or minutes) associated with a card number is stored in a database, and the database is updated to reflect the reduction in value that occurs each time the card is used to purchase goods and/or services. For example, when a user, or someone the user has authorized, presents the card at a POS to purchase goods and/or services, the POS computer 510 communicates with the server computer 502 to receive authorization for the transaction. The server computer 502 determines if the card number is active and if the card contains enough value to cover the desired purchase. If the transaction is authorized and concluded, then the server computer 502 updates the database with the present value of the card. Although the server computer 502 is illustrated as a single computer in FIG. 5, in other embodiments the function of the server computer 502 can be provided by two or more computers without departing from the spirit or scope of this disclosure. For example, in one such embodiment a first computer will provide the authorization function by communicating with various financial institutions, and a second computer will maintain and update the databases containing card usage information and status.

In another embodiment of the value exchange system 500, the value of a card (e.g., a "smart card") may be recorded (i.e., written) directly on the card itself (e.g., with a computer memory/processor on the card) and decremented each time the card is used. In this embodiment, the value exchange machine 100 can both read and write to cards and, accordingly, access to one or both of the server computer 502 and the financial institution computer 506 may not be required. For example, in one embodiment, the user selects the desired type of card (e.g., a prepaid cash card), and inputs funds (e.g., by depositing coins and/or cash). In this embodiment, after counting the funds received from the user to arrive at a value, the machine 100 can write that particular value to a new card and dispense the card to the user. In another embodiment, the user may desire to add value to an existing "smart card," "stored-value card," or the like. In this embodiment, after inputting his/her funds, the user can submit the existing smart card to the machine 100 to have the additional value written directly to the card (i.e., to "recharge" or "reload" the card). In either embodiment, when the card is subsequently used in commerce, a card writer at the POS can decrement the card for the amount of the particular purchase.

The value exchange system 500 can include other functionalities in addition to those discussed above. For example, in one embodiment the value exchange system 500 allows a user to access an account web site 530 from a remote general-purpose user computer 520, such as a personal computer. In one aspect of this embodiment, the account web site 530 is hosted by the card server 502 and can be accessed over a second communications link 526. The second communications link 526 can be the Internet or another computer network. In another embodiment, the second communications link 526 and the first communications link 504 can be the same communications link. For example, in this embodiment, both the first and second communications links 504 and 526 can be the Internet. The account web site 530 can allow users to remotely conduct the following transactions: register new cash cards, obtain balance inquiries, add value to existing cards, review recent transaction history, and/or purchase new cards.

In addition to the foregoing, a user can also utilize the value exchange system 500 to pick up tickets and other items reserved or purchased on-line. In this embodiment, the user first accesses a ticket seller web site 540 to reserve or purchase tickets and receive a ticket reservation number. The user can then visit a conveniently located machine 100 and enter the reservation number and/or a PIN. The machine 100 then communicates with the ticket seller web site 540 via the first communications link 504 to obtain authorization to dispense the tickets. After obtaining the authorization, the machine 100 dispenses the tickets to the user.

While selected aspects of the value exchange system 500 have been described above for purposes of illustration, those of ordinary skill in the relevant art will appreciate that various other functionalities can be combined with this system in accordance with this disclosure to further enhance the utility of the system. For example, other types of informational- or transactional-based web sites can be accessed via the value exchange machine 500 to obtain yet other forms of data and/or accomplish other forms of transaction. For example, the machine 100 can access a novelty card web site 542 to obtain authorization to dispense novelty items or cards, such as baseball cards. Further, a phone card web site 541 can also be included in the system 500 to provide the infrastructure necessary for the user to purchase or recharge prepaid phone cards from the machine 100 as described above.

Figure 6:
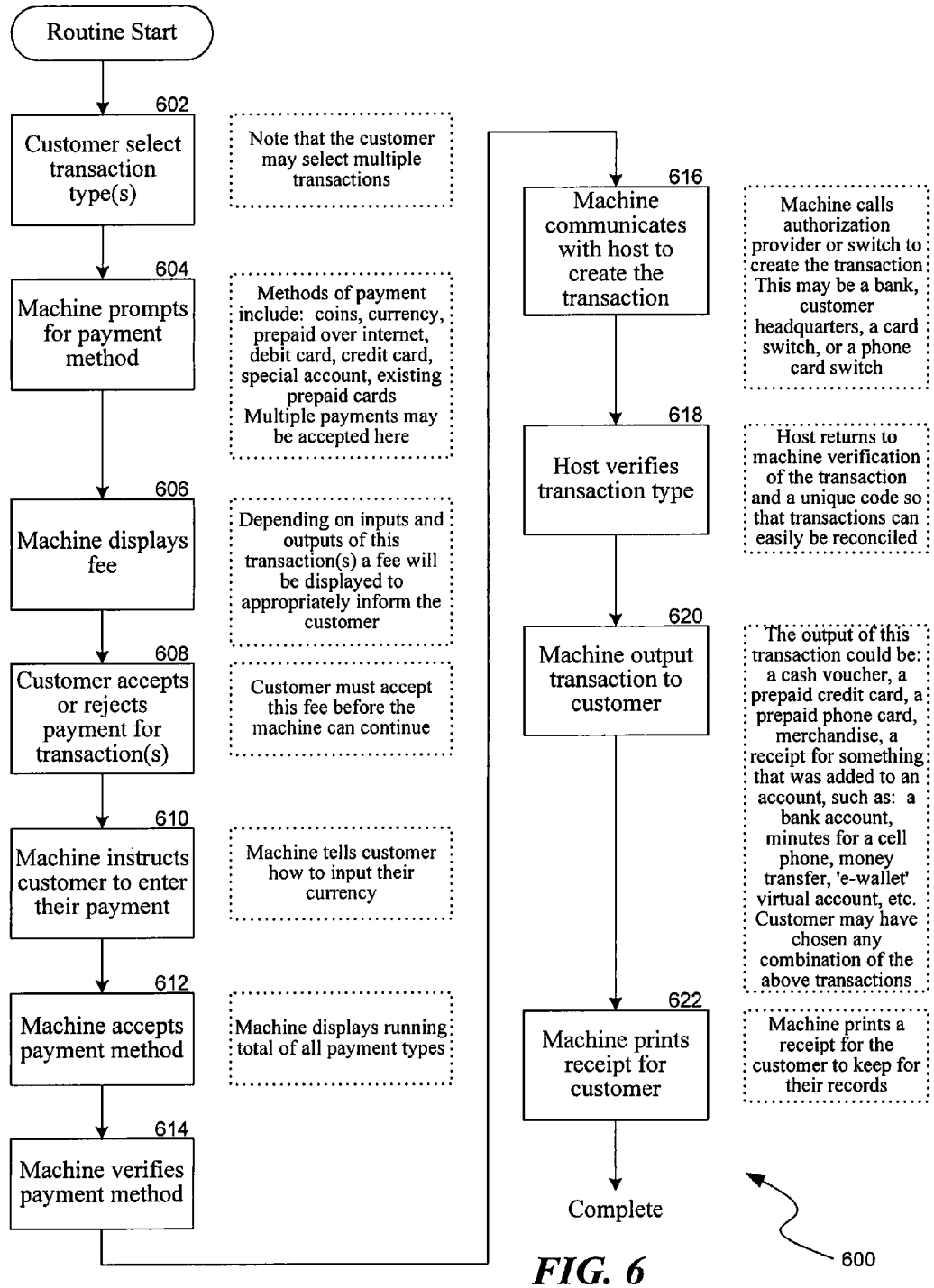
FIG. 6 is a flow diagram illustrating a routine implemented by the value exchange system of FIG. 5 in one embodiment.

FIG. 6 is a flow diagram illustrating a routine 600 implemented by the value exchange system 500 of FIG. 5 in one embodiment. In block 602, a user selects one or more desired transactions at the machine 100 (FIG. 1). In one aspect of this embodiment, the user may elect to perform multiple transactions with multiple types of input and receive multiple types of output. In block 604, the machine 100 prompts the user for the method or methods of payment. As discussed in detail above, the user may elect to pay for the transaction with coins, currency, credit card, debit card, checking or savings account transfers, or value prepaid over the Internet. In block 606, in one embodiment, the machine displays a fee associated with the selected transaction. In block 608, the user accepts or rejects the fee. If the user accepts the fee, in block 610, the user is prompted to enter his/her form of payment into the machine 100. In block 612, the machine 100 accepts the payment from the user, and in block 614, the machine 100 verifies the payment method.

In block 616, the machine 100 communicates with a host computer, e.g., the server computer 502 of FIG. 5, to initiate the transaction. The server computer 502 authorizes the transaction via the financial institution computer 506 and one or more of a bank, a credit card institution, a debit card institution, or a prepaid phone card-issuing institution, as required. In block 618, the server computer 502 returns a unique code to the machine 100 that can be utilized to verify or reconcile the transaction.

In block 620, the machine 100 outputs the results of the transaction to the user. As explained above, the output can include a cash redeemable voucher, a prepaid credit card or cash card, a prepaid phone card, and/or an event or travel ticket. In block 622, the machine 100 prints a receipt and issues it to the user for his/her records. In the event the user is "topping up" an existing credit card or phone card, or transferring money to or from an account, the user will receive a receipt documenting the money transfer. It will be apparent to those of ordinary skill in the art that any combination of the foregoing transactional outputs is possible in accordance with this disclosure.

Figure 7:
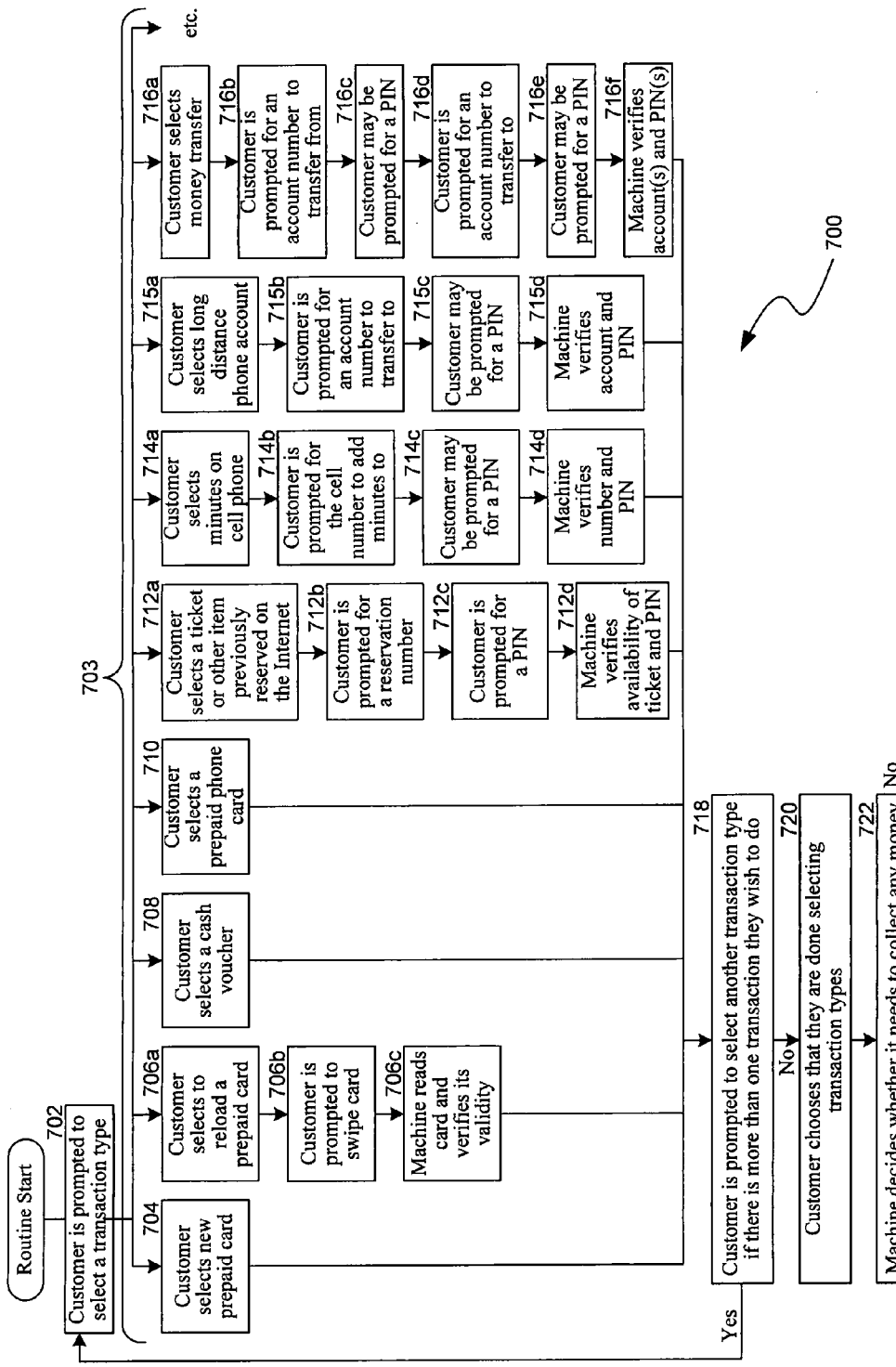
FIG. 7 is a flow diagram illustrating a routine for receiving a transaction selection from a user in one embodiment.
Figure 8:
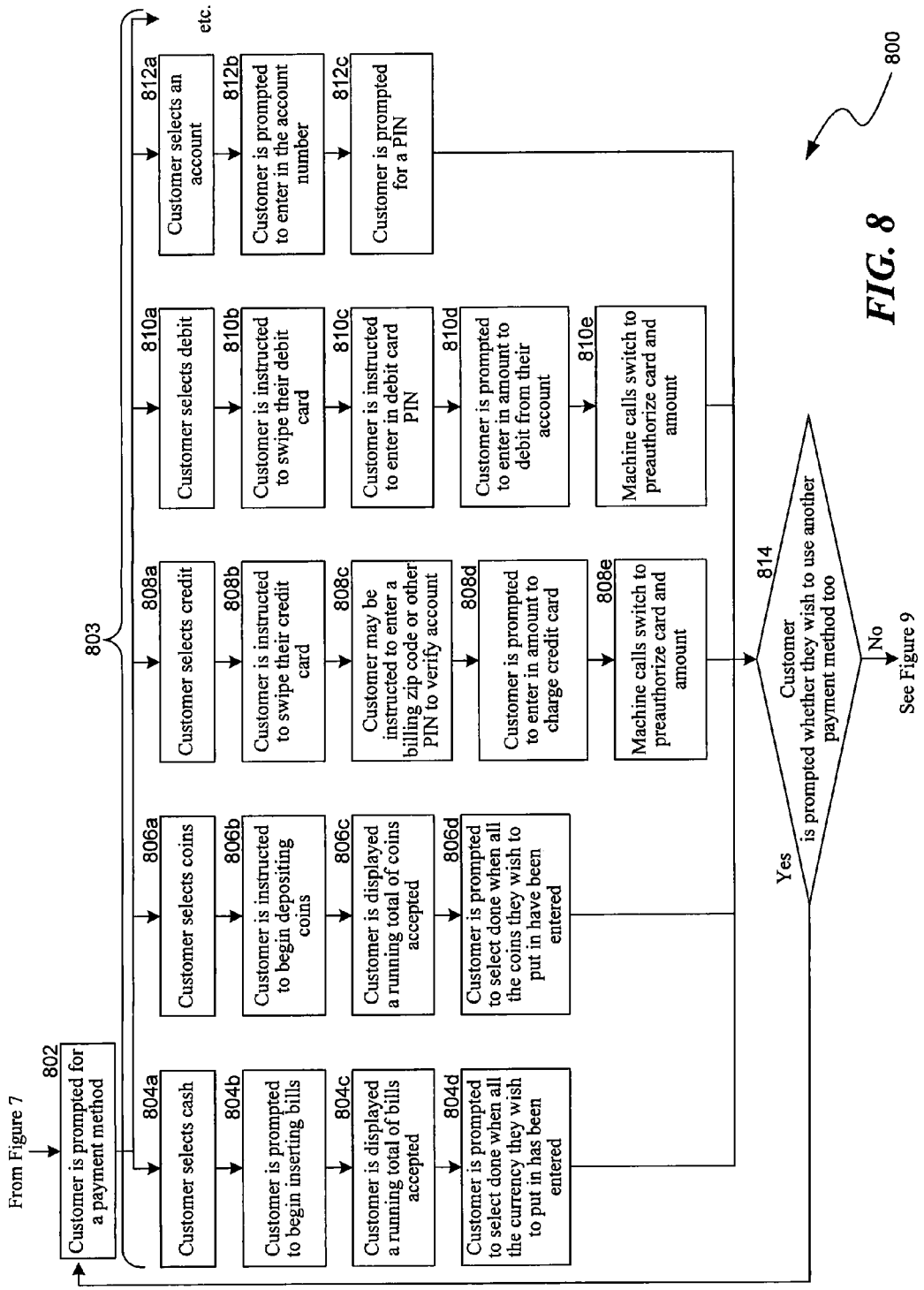
FIG. 8 is a flow diagram illustrating a routine for inputting various forms of payment in one embodiment.
Figure 9:
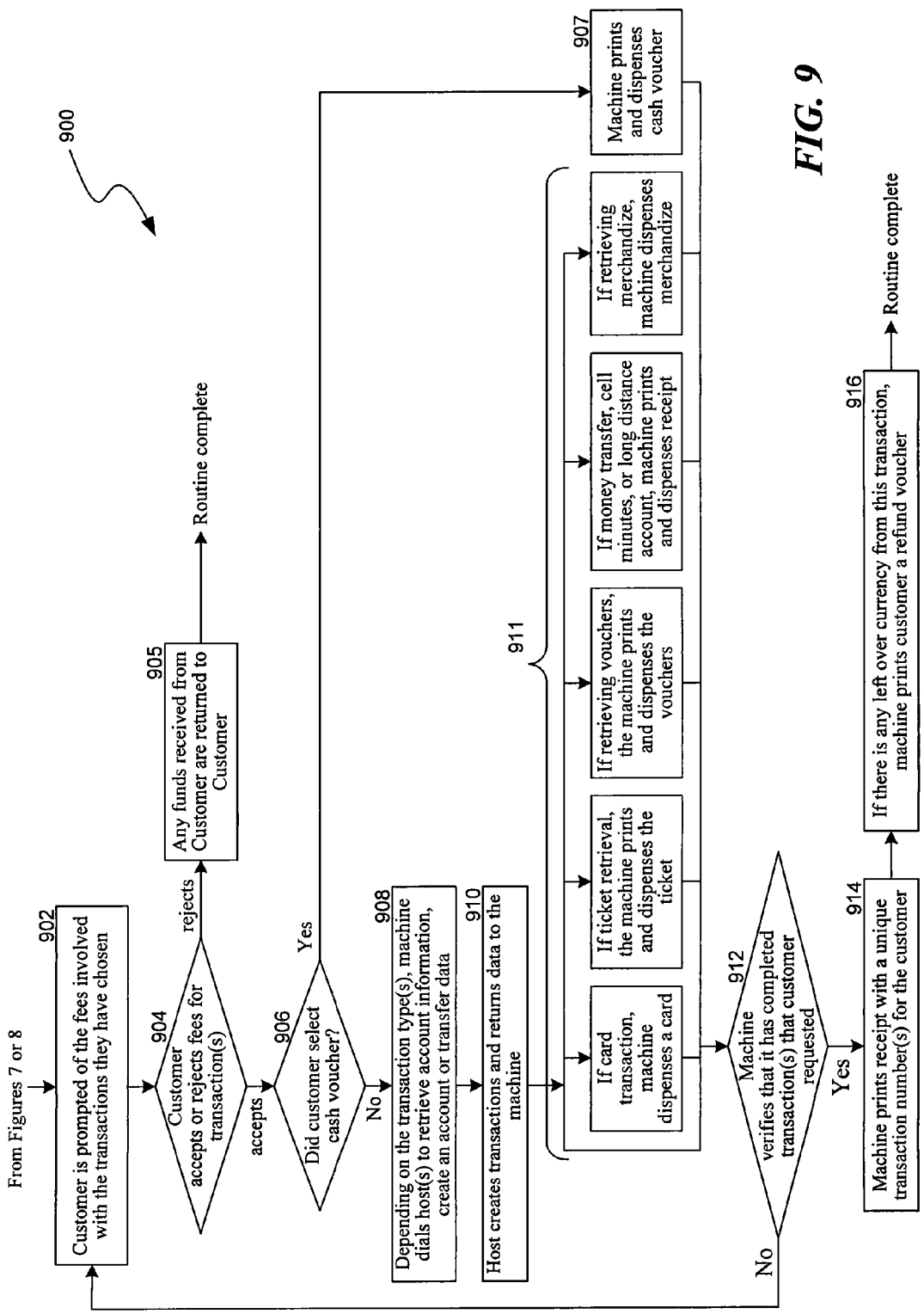
FIG. 9 is a flow diagram illustrating a routine for completing a selected transaction in one embodiment.

FIGS. 7-9 are flow diagrams that together illustrate a routine for conducting a transaction with the machine 100 of FIG. 1 in accordance with an embodiment. Referring first to FIG. 7, FIG. 7 is a flow diagram illustrating a routine 700 for receiving a transaction selection from a user in one embodiment. In block 702, the user is prompted to select a transaction type or option. As illustrated in blocks 703, the user can select from numerous transaction options that include: obtaining a new prepaid card (block 704), reloading or "topping up" an existing prepaid card (block 706a), obtaining a redeemable cash voucher (block 708), obtaining a prepaid phone card (block 710), obtaining a ticket or other item previously reserved and/or paid for over the Internet (block 712a), adding minutes to an existing cell phone account (block 714a), adding time to an existing long distance account (block 715a), or transferring money to an account (block 716a). After the user has selected the desired transaction, the machine may prompt the user for additional information. For example, if the user elects to reload a prepaid card (block 706a), then in block 706b the user is prompted to swipe the card through the card reader 202 (FIG. 2). In so doing, the machine 100 reads the card and verifies its validity by communicating with one or more internal or remote databases, as explained above. Similarly, if the user elects to receive a ticket previously ordered over the Internet (block 712a), then in block 712b the user is prompted for an associated reservation number. Once the reservation number has been entered, in block 712c the user is prompted for a PIN. After receiving the PIN, in block 712d the machine 100 verifies the PIN and the availability of the ticket. If instead the user elects to transfer money from, for example, a first account to a second account (block 716a), then in block 716b user is prompted to enter an account number for the first account from which the money will be withdrawn. In addition, in block 716c the user may be prompted for a PIN associated with the first account. After this information has been entered, in block 716d the machine 100 prompts the user for an account number for the second account into which the money will be deposited. In block 716e, the user may be prompted for a PIN associated with second account. After this information has been entered, in block 716f the machine 100 verifies the respective account numbers and, if applicable, the respective PINs. If the user will be depositing the funds for transfer to the second account instead of withdrawing them from the first account, then the user selects this option and does not enter a first account number.

In block 718, the user is prompted to select another transaction type if there is more than one transaction the user wishes to perform. If the user does wish to perform a second transaction, the routine returns to block 702 and the user is prompted to select a second type of transaction. If the user does not wish to perform a second transaction, then in block 720 the user indicates that he/she is done selecting transaction types. In block 722, the machine determines whether it needs to collect any funds from the user for the selected transaction (s). If the machine determines that the user needs to deposit funds for the transaction, then the routine 700 proceeds to routine 800 shown in FIG. 8. Otherwise, the routine 700 proceeds to routine 900 shown in FIG. 9.

FIG. 8 is a flow diagram illustrating the routine 800 for inputting various forms of payment in one embodiment. In block 802, a user is prompted for a payment method. As illustrated in blocks 803, the user can select from numerous forms of payment. For example, the user may elect to pay for the transaction with cash (e.g., dollar bills) (block 804a), coins (e.g., a plurality of randomly oriented coins) (block 806a), credit (block 808a), debit (block 810a), and/or funds from various types of payment accounts (block 812a). If the user elects to pay with cash as in block 804a, then in block 804b the user is prompted to begin inserting bills into the bill acceptor 204 (FIG. 2). As the user is inserting bills, in block 804c a running total of the bills inserted and accepted is displayed, for example, on the screen 118 of the machine 100 shown in FIG. 1. In block 804d, the user is prompted to indicate when he/she is done inserting bills.

If the user elects to pay for the transaction with coins as in block 806a, then in block 806b the user is instructed to deposit the coins, for example, by placing them in the coin tray 106 of the machine 100 shown in FIG. 1 and rotating the tray 106 upwardly to deliver the coins to the coin sorting/counting apparatus 112. In block 806c, a running total of the coins that have been deposited and counted is displayed, for example, on the screen 118. The user is then prompted in block 806d to indicate when all of the coins have been deposited. If the user elects to pay for the transaction with credit as in block 808a, then in block 808b the user is instructed to swipe their credit card through the card reader 202. In block 808c, the user may be instructed to enter a number, such as his/her zip code, to verify the account. After swiping the credit card or otherwise entering the account information, in block 808d, the user is prompted to enter the amount that the user wishes to charge to the credit card account. Once the user has input this information, in block 808e, the machine 100 contacts the server computer 502 (FIG. 5) to preauthorize use of the credit card for the amount requested, as explained above.

If the user elects to pay for the selected transaction with a debit card as in block 810a, then in block 810b the user is instructed to swipe the debit card through the card reader 202. The user is then instructed in block 810c to enter a debit card PIN to verify user authorization. After entering the PIN, in block 810d the user is prompted to enter the amount to debit the associated account for the selected transaction. After this information has been entered, in block 810e the machine 100 communicates with the server computer 502 to authorize use of the account for the amount of the debit. If instead the user elects to pay for the selected transaction by transferring money from an account as shown in block 812a, then in block 812b the user is prompted to enter the number of the account. In block 812c, the user may also be prompted to enter a PIN associated with the account.

In decision block 814, after the user has entered the first form of payment and any other necessary information, the user is prompted as to whether they wish to include an additional form of payment. If the user wishes to use an additional form of payment for the selected transaction, then the routine 800 returns to block 802. If the user is finished entering payment, then the routine proceeds to the routine 900 shown in FIG. 9.

FIG. 9 is a flow diagram illustrating a routine 900 for completing a selected transaction in one embodiment. In block 902, the machine 100 displays the fees associated with the selected transaction for viewing by the user. In decision block 904, the user accepts or rejects the fees. If the user rejects the fees, then in block 905 the routine returns any funds received from the user back to the user and the routine is complete. If the user accepts the fees, then in decision block 906 the routine determines if the user elected to receive a redeemable cash voucher. If so, then in block 907 the machine prints the cash voucher and dispenses it to the user. If, instead, the user elected to receive a prepaid card (e.g., for cash, credit, or phone minutes), receive a preordered ticket, transfer money, etc., then in block 908 the machine contacts a host computer (e.g., the server computer 502 of FIG. 5) to provide account information to authorize the transaction, create an account, or transfer account data. In block 910, the host computer performs the necessary transactions with, for example, a financial institution or a phone card-issuing institution, and returns the necessary authorization data to the machine 100.

Once the transaction has been authorized, the machine 100 issues the desired output to the user according to one of the blocks 911. For example, if the user selected a prepaid cash card or phone card, the machine 100 dispenses the selected type of card to the user via the card outlet 208 shown in FIG. 2. Similarly, if the user selected a ticket, the machine 100 dispenses it to the user via the ticket outlet 210 shown in FIG. 2. In decision block 912, the machine 100 verifies that it has performed all of the transactions requested by the user. If the machine 100 has not completed the requested transactions, then the routine 900 returns to block 902 and repeats. If all the requested transactions have been performed, then in block 914 the machine 100 prints a receipt with a unique transaction number and issues it to the user. In block 916, if any currency is left over from the selected transaction, the machine 100 dispenses it to the user from the coin return slot 110 shown in FIG. 1.

It will be appreciated from the foregoing that although specific embodiments of the value exchange system 500 (FIG. 5) and the value exchange machine 100 (FIG. 1) are described for purposes of illustration, other embodiments can be implemented without departing from the spirit or scope of this disclosure. For example, in one other embodiment, in addition to providing various services to users via the value exchange machine 100, the system can also provide various functionalities to a remote user operating a general-purpose computer, such as the user computer 520 (FIG. 5). In this alternate embodiment, the user can access various on-line web sites to purchase or reserve various products. For example, a user may visit the ticket seller web site 540 to purchase tickets for an event and pay for the tickets with a credit card. In this embodiment, the ticket seller web site 540 then makes the purchase information available to the machine 100 so the user may then visit the machine 100 to receive the actual tickets. In another embodiment, the user can order the tickets on-line at the ticket seller web site 540 and pay for the tickets by depositing funds into the machine 100 at the time of receipt.

In a further embodiment, a user can access a telephone carrier web site 541 from the user computer 520 (FIG. 5), and pre-purchase a long distance calling card or a wireless phone card on-line. The user can pay for the card on-line (with, e.g., a credit card account) and then receive a unique code or PIN once payment is authorized. In one aspect of this embodiment, the user may then visit the machine 100 and enter his/her code to receive the card. In a similar embodiment, the user can reserve the card on-line, but not pay for the card until visiting the machine 100.

In yet another embodiment, long distance minutes may be stored on a particular long distance calling card, much like a "stored value card." In this embodiment, a user can access the telephone carrier web site 541 and pre-purchase additional minutes to put on the card. The user can pay for the additional minutes on line (with, e.g., a credit card account) and then receive a unique code or PIN once payment is confirmed. In one aspect of this embodiment, the user may then visit the machine 100 and enter his/her long distance account number (by, e.g., swiping his/her card) and/or the PIN. The carrier web site 541 can then communicate with the machine 100 and send the corresponding "top up" data to the machine 100. The machine 100 can then add the additional prepaid phone minutes to the user's phone card. In yet another embodiment, communication between the various web sites and the value exchange machines is facilitated by a "host" computer that first receives a communication from the web site and then sends the communication to the respective value exchange machine. These and other changes may be made to the invention in light of the above detailed description.

In still further embodiments, the methods and systems described herein can be used to obtain various types of information. Such information can include, for example, account balance information (e.g., for credit card accounts, checking and savings accounts, cell phone minutes, brokerage accounts, on-line accounts, and the like). Such information can also include salary or other employment information. For example, if a particular employer distributes employee pay in the form of prepaid cash cards, then the employees can utilize the machines 100 to obtain account balance information. Additionally, the employees could utilize the machine 100 in one or more ways as described above to transfer portions of their wages to other accounts for, e.g., bill payment or a person-to-person money transfer. In yet another embodiment, the employees could use the machine 100 to convert a portion of their cash card to a redeemable cash voucher that can be redeemed for cash or used to purchase goods and/or services at a POS.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not necessarily the value exchange system described herein. These and other changes can be made to the invention in light of the above detailed description.

Unless the context clearly requires otherwise, throughout the above description and the following claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list. All of the above U.S. patents and applications and other references described above are incorporated herein by reference.

These and other changes can be made to the invention in light of the above detailed description. In general, the terms used in the following claims should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. For example, if only one aspect of the invention is recited below as embodied in a computer-readable medium, the inventors contemplate that other aspects may likewise be embodied in a computer-readable medium. Accordingly, the inventors reserve the right to add additional claims after filing the application to pursue such additional claim forms for other aspects of the invention. The invention is not limited, except as by the following claims.

We claim:

1. A computer-implemented method for exchanging gift cards, the method comprising:
   positioning a first kiosk in a first publicly accessible area of a first commercial establishment;
   positioning a second kiosk in a second publicly accessible area of a second commercial establishment;
   receiving a first gift card from a first user at the first kiosk;
   crediting a first monetary amount associated with the first gift card to an account;
   dispensing at least one of cash and a redeemable voucher to the first user from the first kiosk in exchange for the first gift card;
   voiding the first gift card;
   receiving funds from a second user at the second kiosk;
   dispensing a second gift card to the second user from the second kiosk in exchange for the funds; and
   debiting a second monetary amount associated with the second gift card from the account.

2. The computer-implemented method of claim 1 wherein dispensing the at least one of cash and the redeemable voucher to the first user includes dispensing a value less than the first monetary amount.

3. The computer-implemented method of claim 1 wherein receiving funds from the second user for the second gift card includes receiving funds having a value less than the second monetary amount.

4. The computer-implemented method of claim 1:
   wherein dispensing the at least one of cash and the redeemable voucher to the first user includes dispensing the at least one of cash and the redeemable voucher having a first value less than the first monetary amount; and wherein receiving funds from the second user for the second gift card includes receiving funds having a second value less than the second monetary amount.

5. The computer-implemented method of claim 1:
wherein receiving the first gift card from the first user includes receiving a first prepaid gift card for making purchases at a retail establishment, the first prepaid gift card having a first gift card balance; and
wherein dispensing the second gift card to the second user includes dispensing a second prepaid gift card for making purchases at the retail establishment, wherein the second prepaid gift card has a second gift card balance equal to or less than the first gift card balance.

6. The computer-implemented method of claim 1:
wherein receiving the first gift card from the first user includes receiving a first prepaid gift card for making purchases at a retail establishment, the first prepaid gift card having a gift card balance; and
wherein the computer-implemented method further comprises selling the gift card balance.

7. The computer-implemented method of claim 6 wherein selling the gift card balance includes selling the gift card balance for a value less than the gift card balance.

8. The computer-implemented method of claim 1:
wherein receiving the first gift card from the first user includes receiving a first prepaid gift card for making purchases at a first retail establishment; and
wherein dispensing the second gift card to the second user includes dispensing a second prepaid gift card for making purchases at a second retail establishment.

9. The computer-implemented method of claim 1, further comprising displaying transaction options to the first user, wherein the transaction options include at least one of exchanging the first gift card for cash value or exchanging the first gift card for another gift card.

10. The computer-implemented method of claim 1 wherein receiving the first gift card from the first user includes receiving at least one of a gift card number, a retail establishment, or a gift card balance associated with the first gift card.

11. The computer-implemented method of claim 1:
wherein the first and second kiosks each include a communications facility coupled to a computer network; and
wherein crediting the first monetary amount associated with the first gift card to the account includes adding the first monetary amount and a first gift card identifier associated with the first gift card to a database, wherein the database is on a remote computer coupled to the first and second kiosks via the communications facilities.

12. The computer-implemented method of claim 11 wherein debiting the second monetary amount associated with the second gift card from the account includes removing the second monetary amount and a second gift card identifier associated with the second gift card from the database.

13. A computer-implemented method for exchanging prepaid cards, the method comprising:
receiving a first prepaid card from a first user at a consumer operated kiosk, wherein receiving the first card includes receiving at least one of a physical card, a card number, a card balance, or a bar code associated with the first prepaid card;
crediting a first monetary amount associated with the first prepaid card to an account;
dispensing at least one of cash and a redeemable voucher to the first user from the first kiosk in exchange for the first card;
receiving funds from a second user at the consumer operated kiosk;
debiting a second monetary amount associated with the second prepaid card from the account; and
dispensing a second prepaid card to the second user from the consumer operated kiosk in exchange for the funds, wherein the second card is at least one of the first prepaid card or a new prepaid card associated with the first card.

14. The computer-implemented method of claim 13, further comprising reselling the first prepaid card to the second user.

15. The computer-implemented method of claim 14 wherein reselling the first prepaid card to the second user includes reselling the first prepaid card to the second user from a location remote from the consumer operated kiosk.

16. The computer-implemented method of claim 13 wherein the consumer operated kiosk is a first consumer operated kiosk, and wherein the computer-implemented method further comprises:
positioning the first consumer operated kiosk in a first publicly accessible area of a first commercial establishment; and
positioning a second consumer operated kiosk in a second publicly accessible area of a second commercial establishment, wherein the first and second consumer operated kiosks each include a communications facility configured to communicate with a remote computer network.

17. The computer-implemented method of claim 13 wherein the account includes a plurality of monetary amounts associated with a corresponding plurality of prepaid cards.

* * * * *

UNITED STATES PATENT AND TRADEMARK OFFICE
CERTIFICATE OF CORRECTION

| | | |
|---|---|---|
| PATENT NO. | : 8,229,851 B2 | Page 1 of 1 |
| APPLICATION NO. | : 13/213421 | |
| DATED | : July 24, 2012 | |
| INVENTOR(S) | : Michael Doran et al. | |

It is certified that error appears in the above-identified patent and that said Letters Patent is hereby corrected as shown below:

On Title page 5, item (56); in column 1, under "Other Publications", line 6, delete "199]." and insert -- 1999]. --, therefor.

On Title page 5, item (56); in column 1, under "Other Publications", line 16, delete "Winnepeg" and insert -- Winnipeg --, therefor.

On Title page 5, item (56); in column 2, under "Other Publications", line 68, delete "Referens" and insert -- Reference --, therefor.

On Title page 6, item (56); in column 2, under "Other Publications", line 2, delete "httpl" and insert -- http:/ --, therefor.

On Title page 6, item (56); in column 2, under "Other Publications", line 6, delete "3 •pages." and insert -- 3 pages. --, therefor.

On Title page 6, item (56); in column 2, under "Other Publications", line 12, delete "Lite'?,'"" and insert -- Lite?," --, therefor.

In column 10, line 24, delete "off the" and insert -- of the --, therefor.

In column 10, line 28, delete "that that" and insert -- that --, therefor.

Signed and Sealed this
Thirtieth Day of October, 2012

David J. Kappos
*Director of the United States Patent and Trademark Office*